United States Patent
Ogawa

Patent Number: 6,013,331
Date of Patent: Jan. 11, 2000

[54] CHEMICALLY ABSORBED FILM, METHOD OF MANUFACTURING THE SAME, AND CHEMICAL ABSORPTION SOLUTION USED FOR THE SAME

[75] Inventor: Kazufumi Ogawa, Nara, Japan

[73] Assignee: Matsushita Electric Industrial Co., Ltd., Japan

[21] Appl. No.: 08/918,057

[22] Filed: Aug. 25, 1997

[30] Foreign Application Priority Data

Aug. 26, 1996 [JP] Japan .................................. 8-224218
Feb. 20, 1997 [JP] Japan .................................. 9-036578

[51] Int. Cl.⁷ .............................................. B05D 3/06
[52] U.S. Cl. .............................................. 427/515; 427/352
[58] Field of Search .................................. 427/508, 512, 427/515, 352

[56] References Cited

U.S. PATENT DOCUMENTS

| | | |
|---|---|---|
| 5,225,274 | 7/1993 | Ogawa et al. . |
| 5,240,774 | 8/1993 | Ogawa et al. . |
| 5,284,707 | 2/1994 | Ogawa et al. . |
| 5,324,566 | 6/1994 | Ogawa et al. . |
| 5,338,579 | 8/1994 | Ogawa et al. . |
| 5,380,585 | 1/1995 | Ogawa et al. . |
| 5,391,913 | 2/1995 | Mino et al. . |
| 5,407,709 | 4/1995 | Ogawa et al. . |
| 5,425,989 | 6/1995 | Ogawa et al. . |
| 5,435,839 | 7/1995 | Ogawa . |
| 5,437,894 | 8/1995 | Ogawa et al. . |
| 5,443,511 | 8/1995 | Ogawa et al. . |
| 5,451,459 | 9/1995 | Ogawa et al. . |
| 5,466,486 | 11/1995 | Ogawa et al. . |
| 5,474,839 | 12/1995 | Ogawa et al. . |
| 5,500,250 | 3/1996 | Ogawa et al. . |
| 5,578,340 | 11/1996 | Ogawa et al. . |

FOREIGN PATENT DOCUMENTS

| | | |
|---|---|---|
| 0 476 543 | 3/1992 | European Pat. Off. . |
| 0 482 613 | 4/1992 | European Pat. Off. . |
| 0 571 896 | 12/1993 | European Pat. Off. . |
| 0 748 658 | 12/1996 | European Pat. Off. . |
| 0 748 659 | 12/1996 | European Pat. Off. . |
| 1-70917 | 3/1989 | Japan . |
| 4-356020 | 12/1992 | Japan . |
| 5-31441 | 2/1993 | Japan . |
| 7-114029 | 5/1995 | Japan . |

OTHER PUBLICATIONS

Mino et al, Langmuir 7(7), pp 1468–72, 1991.
Ogawa et al, Langmuir 7(7), pp 1473–7, 1991.
Netzer et al, Thin Solid Films 99, pp 235–241, 1983.

*Primary Examiner*—Erma Cameron
*Attorney, Agent, or Firm*—Merchant & Gould, P.C.

[57] ABSTRACT

A chemically adsorbed film is formed on a substrate surface as a coating film, in which film-composing molecules are inclined in a preferable direction and are bonded and fixed to the substrate surface in a predetermined single direction and at one end. A coating film with excellent anti-abrasion properties is provided by adding the same type of a crosslinking agent as a chemical adsorbent in a chemical adsorption solution in film-forming processes, and then by crosslinking adsorbed molecules. 5 wt. % of $CF_3(CF_2)_7(CH_2)_2SiCl_3$ (chemical adsorbent), 3 wt. % of hexachloro-disiloxane (crosslinking agent), and 92 wt. % of cyclohexane (nonaqueous solvent; bp. 80° C.) are mixed so as to prepare a chemical adsorption solution. The solution is coated on an aluminum substrate in a dry atmosphere, and the solvent is evaporated and removed from the substrate. Thus, a polymer coating film is formed in which molecules are entangled and crosslinked and are covalently bonded to the substrate surface.

9 Claims, 8 Drawing Sheets

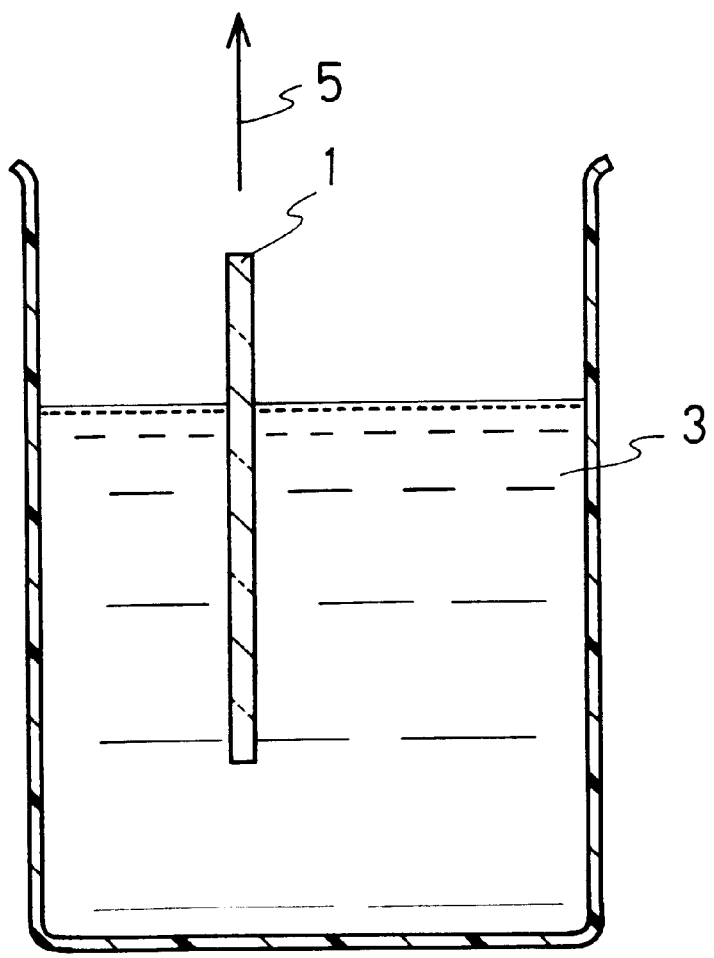
FIG. 1
FIG. 2

CHEMICALLY ABSORBED FILM, METHOD OF MANUFACTURING THE SAME, AND CHEMICAL ABSORPTION SOLUTION USED FOR THE SAME

FIELD OF THE INVENTION

This invention relates to a chemically adsorbed film and a method of manufacturing the same. More specifically, this invention relates to a chemically adsorbed film in which film-composing molecules are bonded and fixed to a substrate surface in a single direction and at one end, and a method of manufacturing the same.

Furthermore, this invention relates to an anti-abrasion monomolecular or polymeric chemically adsorbed film that is covalently bonded to a substrate surface and is crosslinked by a plurality of siloxane bonds, and a method of manufacturing the same.

BACKGROUND OF THE INVENTION

Conventional methods of manufacturing monomolecular and polymeric chemically adsorbed films include a method of manufacturing reliable media by forming a monomolecular film (protective layer), which contains carbons as a main component and bonding atoms, on a recording layer and then chemically bonding the oxygen atoms on the recording layer to the bonding atoms of the protective layer (Japanese Patent Application Tokkai Hei 01-70917), and a method of manufacturing an extremely thin pinhole-free film of a uniform thickness and high density by forming an adsorbed film on a substrate surface with covalent bonds containing —SiO— and then by laminating and covalently bonding a fluoropolymer film containing SiO— bonds on the adsorbed film (Japanese Patent Application Tokkai Hei 05-31441).

However, the conventional methods mentioned above have not yet disclosed a chemically adsorbed film or a chemically adsorbed monomolecular film in which film-composing molecules are covalently bonded to a substrate surface in a particular single direction and at one end, and a method of manufacturing the same.

If a coating film is provided in which film-composing molecules have a preferable orientation direction and are formed on a substrate surface in a predetermined single direction and at one end, the film could be used for molecular elements, polarization plates, light distribution films of liquid crystals and the like.

On the other hand, it has been well known that a monomolecular chemically adsorbed film can be formed by chemically adsorbing a chemical adsorption solution in a liquid phase which is made of a chlorosilane-based adsorbent and a nonaqueous organic solvent (Japanese Patent Application Tokkai Hei 1-70917). The principle of manufacturing a chemically adsorbed monomolecular film in such solution is to form a monomolecular film by dehydrochlorination between active hydrogens such as hydroxyl groups on a substrate surface and the chlorosilyl groups of the chlorosilane-based adsorbent.

However, conventional chemically adsorbed films have poor anti-abrasion properties since they are manufactured simply by the reaction between an adsorbent and a substrate material.

SUMMARY OF THE INVENTION

In order to solve the above-mentioned conventional problems, this invention first aims to provide with excellent efficiency a coating film in which film-composing molecules are bonded to a substrate surface in a predetermined single direction and at one end, and which has excellent adherence strength.

Secondly, this invention aims to improve a chemically adsorbed film so as to provide a coating film with excellent anti-abrasion properties, thus adding anti-heat, anti-abrasion and anti-weathering properties to base materials in products such as electrical goods including hot plates and rice cookers, automobiles, industrial equipment, mirrors, optical lenses, interior goods, items of apparel, etc.

In order to achieve the first objective, a first chemically adsorbed film of this invention is a coating film formed on a substrate surface in which film-composing molecules are bonded and fixed on the substrate surface in a predetermined single direction and at one end.

It is preferable that the film-composing molecules contain a carbon chain or a siloxane bonding chain.

It is also preferable that the carbon at one section of the carbon chain has an optical activity.

It is preferable that the film-composing molecules contain Si at the end of a molecule.

It is further preferable that the coating film is a monomolecular film.

A first method of manufacturing the first chemically adsorbed film of this invention includes the steps of:

contacting a substrate with a chemical adsorption solution, thus bonding and fixing the molecules of a surface active agent in the adsorption solution to a substrate surface by chemical reaction between the molecules of the surface active agent and the substrate surface; and rinsing the substrate with an organic solvent and then exposing the substrate to light polarized to a predetermined direction through a polarization plate so as to change the orientation direction of the molecules of the surface active agent to a predetermined single direction.

A second method of manufacturing the first chemically adsorbed film of this invention includes the steps of:

contacting a substrate with a chemical adsorption solution, thus bonding and fixing the molecules of a surface active agent, contained in the adsorption solution to a substrate surface by chemical reaction between the molecules of the surface active agent and the substrate surface; and rinsing the substrate with an organic solvent, and removing the solvent from the substrate by letting the substrate stand in a predetermined direction so as to drain off the adsorption solution, thus inclining and orienting the molecules of the surface active agent in a predetermined single direction.

It is preferable that a process of exposing the substrate to light polarized in a predetermined direction through a polarization plate is carried out after the solution drain-off process.

In the first and second method, it is preferable to use a silane-based surface active agent as the surface active agent that contains straight-chain hydrocarbon groups or siloxane bond chains and at least one active group selected from the group consisting of chlorosilyl groups, alkoxysilane groups and isocyanatosilane groups.

It is also preferable in the first and second method that various types of silane-based surface active agents, having different molecular lengths, are mixed as the silane-based surface active agent that contains straight-chain hydrocarbon groups or siloxane bond chains and at least one active group selected from the group consisting of chlorosilyl groups, alkoxysilyl groups and isocyanatosilyl groups.

It is preferable in the first and second method that the hydrocarbon group contains, at the end of a hydrocarbon group, a halogen atom or at least one group selected from the group consisting of a methyl group, a phenyl group (—$C_6H_5$), a cyano group (—CN), and a trifuluoromethyl group (—$CF_3$).

In the first and second method, it is also preferable that the light applied for light exposure has at least one wavelength selected from the group consisting of 436 nm, 405 nm, 365 nm, 254 nm and 248 nm.

In the first and second method, it is preferable that a silane-based surface active agent is used as the surface active agent that contains straight-chain hydrocarbon groups or siloxane bond chains and chlorosilyl groups or isocyanatosilane groups, and that a nonaqueous organic solvent (solvent containing no water) is used as the organic solvent for the purpose of rinsing.

It is also preferable in the first and second method that the nonaqueous organic solvent is at least one solvent selected from the group consisting of solvents containing alkyl groups, fluorocarbon groups, chlorocarbon groups and siloxane groups.

In order to achieve the second objective, a second chemically adsorbed film of this invention is a polymer coating film in which film-composing molecules are covalently bonded to a substrate surface and which is randomly crosslinked by a plurality of siloxane bonds of the remaining groups of polyhalosilane or polyalkoxysilane.

A third chemically adsorbed film of this invention is a monomolecular coating film in which film-composing molecules are covalently bonded to a substrate surface and which is randomly crosslinked by a plurality of siloxane bonds of the remaining groups of polyhalosilane or polyalkoxysilane.

The second and third chemically adsorbed films of the invention have superior anti-abrasion properties, improving the usually weak conventional chemically adsorbed films.

A method of manufacturing a polymeric chemically adsorbed film crosslinked by siloxane bonds includes the steps of:

contacting a substrate, which contains active hydrogen groups on its surface, with a chlorosilane-based chemical adsorption solution—which is prepared by mixing a chlorosilane-based adsorbent containing chlorosilyl groups and straight-chain carbon chains, a chlorosilane-based crosslinking agent containing a plurality of chlorosilyl groups, and a nonaqueous organic solvent (solvent containing almost no water)—thus reacting a substrate surface with the molecules in the adsorption solution; and evaporating the solvent and then reacting unreacted materials left on the substrate with water. If the boiling point of the nonaqueous organic solvent is 50–100° C., it would be more convenient in removing the solvent from the polymeric chemically adsorbed film.

A method of manufacturing a monomolecular chemically adsorbed film crosslinked by siloxane bonds includes the steps of:

contacting a substrate, which contains active hydrogen groups on its surface, with a chlorosilane-based chemical adsorption solution—which is prepared by mixing a chlorosilane-based adsorbent containing chlorosilyl groups and straight-chain carbon chains, a chlorosilane-based crosslinking agent containing a plurality of chlorosilyl groups, and a nonaqueous organic solvent—thus reacting a substrate surface with the molecules in the solution; and rinsing and removing materials not reacted with the substrate and left on the substrate surface with a nonaqueous organic solvent; and evaporating the solvent and then reacting the unreacted materials on the substrate with water. If the boiling point of the nonaqueous organic solvent used for the adsorption solution is 100–250° C., it would be more convenient in stabilizing the composition of the adsorption solution. Also, when a material is applied in which at least one section of the carbon chain of the chlorosilane-based adsorbent is replaced by a fluorocarbon group (—$CF_2$—), a water-repellent chemically adsorbed film can be provided and conveniently adds anti-contamination properties. Furthermore, a chemically adsorbed film having excellent water-repellent properties would be provided if $CF_3$—$(CF_2)_n$—$(R)_m$—$SiX_pCl_{3-p}$ (where n represents 0 or an integer; R is an alkyl group, a vinyl group, an ethynyl group, an aryl group, or a substituent containing a silicon or oxygen atom; m is 0 or 1; X is H, an alkyl group, an alkoxyl group, a fluoroalkyl group or fluoroalkoxy group; and p is 0, 1 or 2) is used as the chlorosilane-based adsorbent. It is preferable to use at least one of the crosslinking agents selected from the group consisting of $SiCl_4$, $SiHCl_3$, $SiH_2Cl_2$ and Cl—$(SiCl_2O)_n$—$SiCl_3$ (where n is an integer) as the chlorosilane-based crosslinking agent, thus improving anti-abrasion properties. There is no limitation on the shapes and materials of a substrate as long as the substrate contains active hydrogen on its surface. The examples of the substrate include metals, ceramics, glass, plastics, papers, fibers, and leathers. If the plastics or fibers are water-repellent, the surface of the material should be treated to be hydrophilic in advance in a plasma or corona atmosphere containing oxygen. As a result, superior anti-abrasion properties would be added to the treated plastics or fibers.

It is preferable to carry out the manufacturing processes in a dry atmosphere with 35% or below relative humidity so as to stabilize the processes.

Generation of hydrochloric acids would be prevented if an isocyanate-based adsorbent and a isocyanate-based crosslinking agent are applied instead of a chlorosilane-based adsorbent and a chlorosilane-based crosslinking agent.

On the other hand, a polymeric chemically adsorbed film crosslinked by siloxane bonds can also be manufactured by the steps of:

contacting a substrate, which contains active hydrogen groups on its surface, with an alkoxysilane-based chemical adsorption solution, in which a silanol condensing catalyst is added and mixed in an alkoxy-based adsorbent, an alkoxy-based crosslinking agent and a nonaqueous organic solvent, thus reacting the substrate surface with these agents; and evaporating the solvent and then reacting the unreacted materials left on the substrate with water. If the boiling point of the nonaqueous organic solvent is 50–100° C., it would be convenient in removing the solvent from the polymer chemically adsorbed film.

In addition, a monomolecular chemically adsorbed film, crosslinked by siloxane bonds, can also be manufactured by the steps of:

contacting a substrate, which contains active hydrogen groups on its surface, with an alkoxysilane-based chemical adsorption solution in which a silanol condensing catalyst is added to an alkoxy-based adsorbent, an alkoxy-based crosslinking agent and a nonaqueous organic solvent, thus reacting the substrate surface with the molecules;

rinsing and removing the materials not reacted to the substrate and left on the substrate surface with a nonaqueous organic solvent; and evaporating the solvent and then reacting the unreacted materials left on the substrate with water. If the boiling point of the nonaqueous organic solvent in the adsorption solution is 100–250° C., it would be convenient in stabilizing the composition of the adsorption solution. A stable coating film with excellent anti-abrasion properties is provided if tetraalkoxysilane, hexaalkoxydisiloxane, octaalkoxytrisiloxane, or the like is used as the alkoxy-based crosslinking agent. Stable cross-linking properties are added by using a silanol condensing catalyst such as carboxylic metallic salts, carboxylic ester metallic salts, carboxylic metallic salt polymers, carboxylic metallic salt chelates, ester titanates, or ester chelate titanates. Furthermore, a manufacturing process can be shortened by using a silanol condensing catalyst including carboxylic metallic salts such as tin (II) acetate, dibutyl tin dilaurate, dibutyl tin dioctate, dibutyl tin diacetate, dioctyl tin dilaurate, dioctyl tin dioctate, dioctyl tin diacetate, tin (II) dioctane acid, naphthenate lead, naphthenate cobalt and 2-ethyl hexene acid iron, carboxylic ester metallic salts such as dioctyl tin bisoctylthioglycol acid ester salt and dioctyl tin maleic ester salts, carboxylic metallic salt polymers such as dibutyl tin maleate polymer and dimethyl tin mercaptopropiolic acid salt polymer, carboxylic metallic salt chelates such as dibutyl tin bisacetyl acetate and dioctyl tin bisacetyllaurate, ester titanates such as tetrabutyltitanate and tetranonyltitanate, or ester chelate titanates such as bis(acetylacetonyl)di-propyltitanate. In addition, if fluorocarbon groups are added to an alkoxysilane adsorbent, a water- and oil-repellent chemically adsorbed film would be manufactured. As an alkoxysilane adsorbent containing fluorocarbon groups, it is preferable to use $CF_3-(CF_2)_n-(R)_m-SiX_p(OA)_{3-p}$ (where n represents 0 or an integer; R is an alkyl group, a vinyl group, an ethynyl group, an aryl group, or a substituent containing silicon or oxygen atoms; m is 0 or 1; X is H, an alkyl group, an alkoxyl group, a fluoroalkyl group or fluoroalkoxy group; A is an alkyl group; and p is 0, 1 or 2) or $CF_3COO-(CH_2)_w-SiX_p(OA)_{3-p}$ (where W is an integer; X is H, an alkyl group, an alkoxyl group, a fluoroalkyl group or fluoroalkoxy group; A is an alkyl group; and p is 0, 1 or 2). The examples of a substrate include metals, ceramics, glass, plastics, papers, fibers, and leathers. If the surface of plastics or fibers are treated to be hydrophilic beforehand in a plasma or corona atmosphere containing oxygen, further anti-abrasion properties would be added to a coating film. A nonaqueous hydrocarbon solvent or a fluorocarbon solvent containing no water is preferably used as the nonaqueous solvent.

A solution is provided as a chemical adsorption solution that contains a chlorosilane-based adsorbent, a chlorosilane-based crosslinking agent, and a nonaqueous solvent containing no active hydrogen. If the chlorosilane-based adsorbent contains fluorocarbon groups, the chemical adsorption solution would provide a water- and oil-repellent coating film. A stable chemical adsorption solution would be prepared by using a hydrocarbon-based solvent, a silicone-based solvent, or a fluorocarbon-based solvent as the nonaqueous solvent containing no water.

As a chemical adsorption solution, a solution is prepared by dissolving an alkoxysilane-based adsorbent, an alkoxysilane-based crosslinking agent, a non-aqueous solvent containing no active hydrogens, and a silanol condensing catalyst. It is preferable if the alkoxysilane adsorbent contains fluorocarbon groups, so that a water-repellent coating film can be formed. As the silanol condensing catalyst, one of the carboxylic metallic salts, carboxylic ester metallic salts, carboxylic metallic salt polymers, carboxylic metallic salt chelates, ester titanates or ester chelate titanates is preferably used, so that a chemically adsorbed film can be manufactured efficiently from the chemical adsorption solution. A stable chemical adsorption solution is prepared if the nonaqueous solvent is a hydrocarbon solvent, silicone solvent or fluorocarbon solvent containing no water.

BRIEF DESCRIPTION OF THE DRAWINGS

FIG. 1 is a cross sectional view explaining the chemical adsorption process in manufacturing a chemically adsorbed monomolecular film of Example 1 of this invention.

FIG. 2 is a cross sectional view explaining a rinsing process in manufacturing the chemically adsorbed monomolecular film of Example 1.

DETAILED DESCRIPTION OF THE INVENTION

Figure 3:
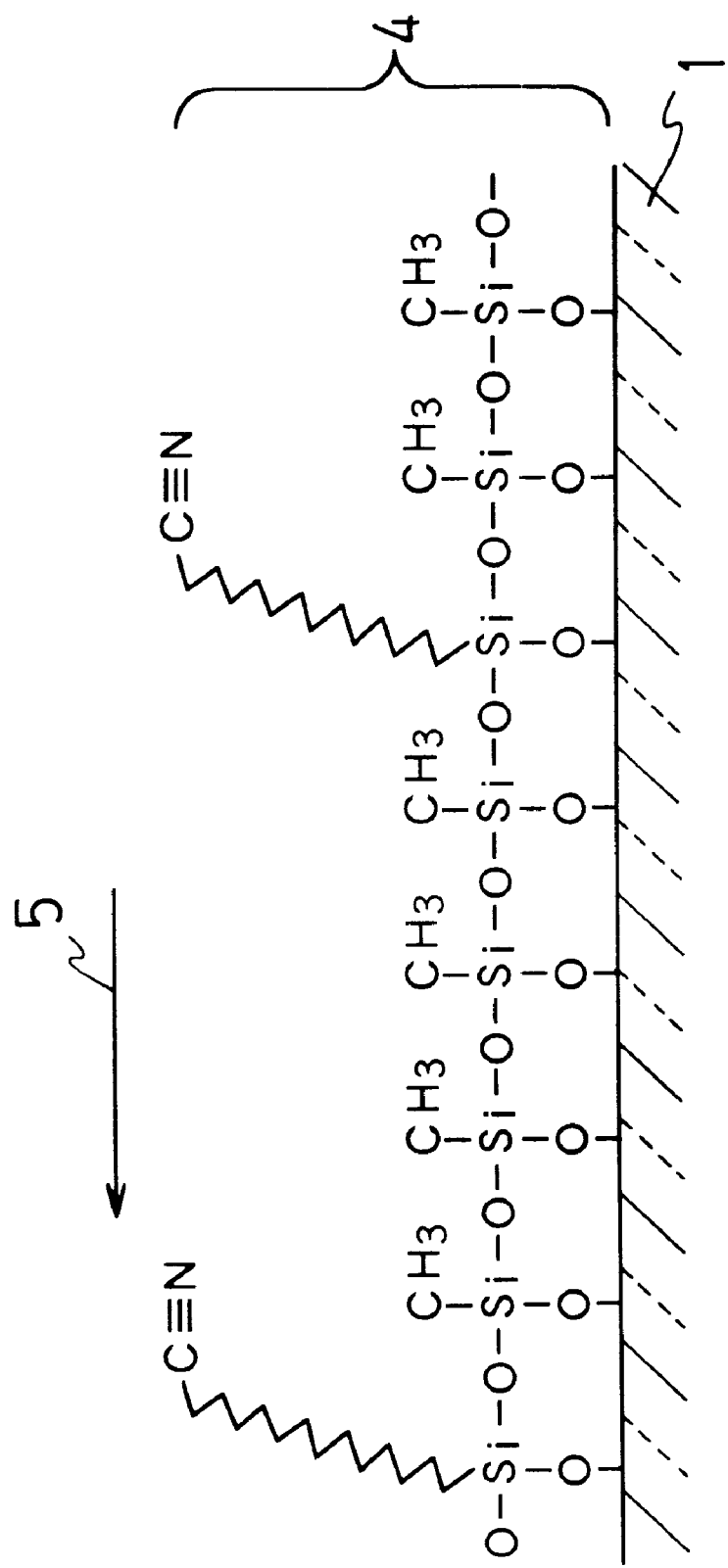
FIG. 3 is a cross sectional view enlarged to a molecular level, explaining the molecular orientation of the chemically adsorbed monomolecular film of Example 1 after the film is rinsed with a solvent.

As described above, the first chemically adsorbed film of this invention is a coating film formed on a substrate surface in which film-composing molecules are inclined in a predetermined direction, and are bonded and fixed on a substrate surface in a predetermined single direction and at one end. If the film-composing molecules contain a carbon chain or a siloxane bond chain, preferable orientation properties would be added to the film. It would also be convenient in improving orientation properties if the carbon at one section of the carbon chain has optical activity. When the film-composing molecules contain Si at the end of a molecule, bonding properties of the film will improve. Furthermore, if the coating film is a monomolecular film, the order of the molecules will improve.

A method of manufacturing such coating film includes the steps of:

contacting a substrate with a chemical adsorption solution, thus bonding and fixing the molecules of a surface active agent of the adsorption solution to a substrate surface at one end by chemical reaction between the molecules of the surface active agent and the substrate surface; and rinsing the substrate with an organic solvent and then exposing the substrate to light, polarized in a predetermined direction through a polarization plate, thus orienting the molecules of the surface active agent in a predetermined single direction. By this method, a chemically adsorbed film is manufactured which has an excellent molecular orientation.

A monomolecular chemically adsorbed film having a superior orientation can be manufactured by the method including the steps of:

contacting a substrate with a chemical adsorption solution, thus bonding and fixing the molecules of a surface active agent contained in the adsorption solution to a substrate surface at one end by chemical reaction between the molecules of the surface active agent and the substrate surface; and rinsing the substrate with an organic solvent, and tilting the substrate in a predetermined direction so as to drain off the solution from the substrate, thus orienting the molecules in the solution drain-off direction; and exposing the substrate to light, polarized in a predetermined direction through a polarization plate, thereby reorienting the molecules of the surface active agent orient with a preferable degree of inclination and in a predetermined single direction. The film would be oriented in a preferable condition if a silane-based surface active agent is used as a surface active agent that contains straight-chain hydrocarbon groups or siloxane bond chains and chlorosilyl groups, alkoxysilane groups or isocyanatosilane groups. It is more preferable if various types of silane-based surface active agents having different molecular lengths are mixed as the silane-based surface active agent that contains straight-chain hydrocarbon groups or siloxane bond chains and chlorosilyl groups, alkoxysilyl groups or isocyanatosilyl groups. Furthermore, the orientation of adsorbed molecules is carried out efficiently when a carbon at one section of the hydrocarbon group has optical activity. The surface energy of the adsorbed film can be controlled well when a hydrocarbon group contains, at the end of the group, a halogen atom or a methyl group, a phenyl group ($—C_6H_5$), a cyano group ($—CN$), or a trifluoromethyl group ($—CF_3$). The orientation of the adsorbed film becomes simple when the light used for light exposure has 436 nm, 405 nm, 365 nm, 254 nm or 248 nm wavelength. A monomolecular chemically adsorbed film of excellent quality can be manufactured when a silane-based surface active agent is used as the surface active agent that contains straight-chain hydrocarbon groups or siloxane bond chains and chlorosilyl groups or isocyanatosilane groups, and when a nonaqueous organic solvent is used as the rinsing organic solvent. In this case, a photosensitive reaction group such as a vinyl group ($>C=C<$), an acetylene bond group (triple bond groups of carbon-carbon) and the like should be incorporated into the straight-chain hydrocarbon group or the siloxane bond chain respectively, so that the heat-resistant properties of the monomolecular film improve when the photosensitive group is reacted by light and is crosslinked or polymerized after the orientation. Moreover, the quality of the monomolecular film obtained can be improved by using a solvent including alkyl groups, fluorocarbon groups, chlorocarbon groups, or siloxane groups, as the nonaqueous organic solvent, since the dehydration can easily occur.

As the characteristics of one embodiment, the first chemically adsorbed film of the invention is manufactured by the steps of:

contacting at least a substrate with a chemical adsorption solution, thus bonding and fixing the molecules of a surface active agent contained in the adsorption solution to a substrate surface at one end by chemical reaction between the molecules of the surface active agent and the substrate surface; and exposing the substrate to light, polarized in a predetermined direction through a polarization plate, thus orienting the molecules of the surface active agent in a predetermined single direction.

Also, a monomolecular chemically adsorbed film is manufactured by the method including the steps of:

contacting at least a substrate with a chemical adsorption solution, thus bonding and fixing the molecules of a surface active agent contained in the adsorption solution to a substrate surface at one end by chemical reaction between the molecules of the surface active agent and the substrate surface; and rinsing the substrate with an organic solvent and lifting the substrate in a predetermined direction so as to orient the adsorbed molecules in the lifting direction; and exposing the substrate to light, polarized in a predetermined direction through a polarization plate, thus inclining and reorienting the molecules of the surface active agent in a predetermined single direction.

The second chemically adsorbed film of this invention is a polymer coating film in which film-composing molecules are covalently bonded to a substrate surface and which is crosslinked by a plurality of siloxane bonds, so that the coating film has better endurance than conventional coating films.

The third chemically adsorbed film of this invention is a monomolecular coating film in which film-composing molecules are covalently bonded to a substrate surface and which is crosslinked by a plurality of siloxane bonds, so that the coating film has better endurance than conventional coating films.

A polymeric chemically adsorbed film, crosslinked by siloxane bonds, can be manufactured by the method including the steps of:

contacting a substrate, which has active hydrogen groups on its surface, with a chlorosilane-based chemical adsorption solution is prepared by mixing a chlorosilane-based adsorbent containing chlorosilyl groups and straight-chain carbon chains, a chlorosilane-based non organic crosslinking agent containing a plurality of chlorosilyl groups, and a nonaqueous organic solvent, thus reacting a substrate surface with the molecules in the solution; and evaporating the solvent and then reacting unreacted materials left on the substrate with water. Thus, the chemically adsorbed film has better endurance than conventional coating films.

If the boiling point of the nonaqueous organic solvent is 50–100° C., the removal of the solvent from the coating film becomes easier.

A monomolecular chemically adsorbed film, crosslinked by siloxane bonds, can be manufactured by the method including the steps of:

contacting a substrate, which has active hydrogen groups on its surface, with a chlorosilane-based chemical adsorption solution prepared by mixing a chlorosilane-based adsorbent containing chlorosilyl groups and straight-chain carbon chains, a chlorosilane-based crosslinking agent containing a plurality of chlorosilyl groups and a nonaqueous organic solvent, thus reacting the substrate surface with the molecules; and rinsing and removing the materials, which are not reacted to the substrate and left on the substrate, with a nonaqueous organic solvent; and evaporating the solvent and then reacting the unreacted materials left on the substrate with water. As a result, this monomolecular film will have improved endurance.

If the boiling point of the nonaqueous organic solvent used for the adsorption solution is 100–250° C., the monomolecular film has a constant thickness.

Also, when a material is used in which at least one section of the carbon chain of the chlorosilane-based adsorbent is replaced by a fluorocarbon group ($-CF_2-$), a highly water-repellent chemically adsorbed film is provided.

Furthermore, a monomolecular film having excellent water-repellent properties is provided if $CF_3-(CF_2)_n-(R)_m-SiX_pCl_{3-p}$ (where n represents 0 or an integer; R is an alkyl group, a vinyl group, an ethynyl group, an aryl group, or a substituent containing a silicon or an oxygen atom; m is 0 or 1; X is H, an alkyl group, an alkoxyl group, a fluoroalkyl group or fluoroalkoxy group; and p is 0, 1 or 2) is used as the chlorosilane-based adsorbent.

When a chlorosilane-based crosslinking agent is used which is selected from the group consisting of $SiCl_4$, $SiHCl_3$, $SiH_2Cl_2$ and $Cl-(SiCl_2O)_n-SiCl_3$ (where n is an integer), a highly durable monomolecular film can be formed.

If a substrate is selected from the group consisting of metals, ceramics, glass, plastics, papers, fibers, and leathers, a coating material would be provided that would preserve the sheen and tone of the color of the substrate surface.

If the surface of plastics and fibers is treated to have hydrophilic properties beforehand in a plasma or corona atmosphere containing oxygen, a coating material would be provided that can maintain the sheen and tone of the color of the substrate surface.

A stable coating film can be formed on any substrate by carrying out every treament in a dry atmosphere with 30% or below relative humidity.

The generation of hydrochloric acids is prevented in manufacturing the same coating film as a chlorosilane-based coating film if an isocyanate-based adsorbent and a isocyanate-based crosslinking agent are used instead of a chlorosilane-based adsorbent and a chlorosilane-based crosslinking agent.

The same coating film as a chlorosilane-based coating film can be manufactured on any substrate without generating hydrochloric acids by the method including the steps of:

contacting a substrate, which contains active hydrogen groups on its surface, with an alkoxysilane-based chemical adsorption solution in which a silanol condensing catalyst is added and mixed in an alkoxy-based adsorbent, an alkoxy-based crosslinking agent and a nonaqueous organic solvent, thus reacting the substrate surface to the molecules; and evaporating the solvent and then reacting the unreacted materials left on the substrate with water.

If the boiling point of the nonaqueous organic solvent is 50–100° C., the solvent is easily removed from the film.

The same monomolecular chemically adsorbed film as a chlorosilane-based coating film can be manufactured on any substrate without generating hydrochloric acids by the method including the steps of:

contacting a substrate, which contains active hydrogen groups on its surface, with an alkoxysilane-based chemical adsorption solution in which a silanol condensing catalyst is added and mixed in an alkoxy-based adsorbent, an alkoxy-based crosslinking agent and a nonaqueous organic solvent, thus reacting the substrate surface with various molecules;

rinsing and removing materials, which are left on the substrate and are not reacted with the substrate, with a nonaqueous organic solvent; and evaporating the solvent and then reacting the unreacted materials left on the substrate with water. If the boiling point of the nonaqueous organic solvent is 100–250° C., a monomolecular film with a uniform thickness is provided.

A highly durable monomolecular film would be provided if tetraalkoxysilane, hexaalkoxydisiloxane, octaalkoxytrisiloxane, or the like is used as the alkoxy-based crosslinking agent.

A monomolecular film with excellent endurance can be manufactured in a short period by using a silanol condensing catalyst such as carboxylic metallic salts including tin (II) acetate, dibutyl tin dilaurate, dibutyl tin dioctate, dibutyl tin diacetate, dioctyl tin dilaurate, dioctyl tin dioctate, dioctyl tin diacetate, tin (II) dioctane acid, naphthenate lead, naphthenate cobalt and 2-ethyl hexene acid iron, carboxylic ester metallic salts including dioctyl tin bisoctylthioglycol acid ester salt and dioctyl tin maleic ester salts, carboxylic metallic salt polymers including dibutyl tin maleate polymer and dimethyl tin mercaptopropiolic acid salt polymer, carboxylic metallic salt chelates including dibutyl tin bisacetyl acetate and dioctyl tin bisacetyllaurate, ester titanates including tetrabutyltitanate and tetranonyltitanate, or ester chelate titanates including bis(acetylacetonyl)dipropyltitanate.

If the alkoxysilane adsorbent contains at least fluorocarbon groups ($-CF_2-$), a coating film with excellent endurance and water- and oil-repellent properties would be provided.

A highly durable water- and oil-repellent coating film can be manufactured by using a material as the alkoxysilane adsorbent containing at least fluorocarbon groups such as $CF_3-(CF_2)_n-(R)_m-SiX_p(OA)_{3-p}$ (where n represents 0 or an integer; R is an alkyl group, a vinyl group, an ethynyl group, an aryl group, or a substituent containing silicon or oxygen atoms; m is 0 or 1; X is H, an alkyl group, an alkoxyl group, a fluoroalkyl group or fluoroalkoxy group; A is an alkyl group; and p is 0, 1 or 2) or $CF_3COO-(CH_2)_W-SiX_p(OA)_{3-p}$ (where W is an integer; X is H, an alkyl group, an alkoxyl group, a fluoroalkyl group or fluoroalkoxy group; A is an alkyl group; and p is 0, 1 or 2).

If a substrate is chosen from metals, ceramics, glass, plastics, papers, fibers, and leathers, a coating film would be formed without reducing the tone of colors and sheen of the substrate surface.

A highly durable water- and oil-repellent coating film can be manufactured by treating the surface of plastics or fibers in advance to have hydrophilic properties in a plasma or corona atmosphere containing oxygen.

A coating film can be provided in more stable processes by using a nonaqueous hydrocarbon solvent or fluorocarbon solvent containing no water as the nonaqueous solvent.

By containing at least chlorosilane-based adsorbent, chlorosilane-based crosslinking agent and a nonaqueous solvent coneaining no active hydrogen, a highly durable coating film can be provided.

If the chlorosilane-based adsorbent is a chemical adsorption solution containing fluorocarbon groups, a coating film is provided which has excellent water- and oil-repellency.

A highly stable process of manufacturing a coating film can be obtained by using a hydrocarbon-based solvent, silicone-based solvent or fluorocarbon-based solvent containing no water as the nonaqueous solbent of the chemical adsorption solution.

Like the chlorosilane-based chemical adsorption solution, a chemical adsorption solution that contains at least alkoxysilane-based adsorbent, alkoxysilane-based crosslinking agent and a nonaqueous solvent containing no active hydrogen, and a silanol condensing catalyst can provide a highly durable coating film.

If the alkoxysilane adsorbent contains flurocarbon groups, a highly water- and oil-repellent coating film is provided with the chlorosilane-based adsorption solution.

When the silanol condensing catalyst is carboxylic metallic salts, carboxylic ester metallic salts, carboxylic metallic salt polymers, carboxylic metallic salt chelates, ester titanates or ester chelate titanates, a coating film with better water- and oil-repellent properties can be provided.

As the nonaqueous solvent, a hydrocarbon-based solvent, silicone-based solvent or fluorocarbon-based solvent, containing no water, is used, so that a water- and oil-repellent coating film can be formed in a stable process.

The characteristics of the examples of the second and third chemically adsorbed films of the present invention are explained below.

(Characteristics of the First Example)

As a first manufacturing method, a polymeric chemically adsorbed film which is crosslinked by siloxane bonds is manufactured by the steps of:

contacting a substrate, which contains active hydrogen groups on its surface, with a chlorosilane-based chemical adsorption solution prepared by mixing a chlorosilane-based adsorbent containing chlorosilyl groups and straight-chain carbon chains, a chlorosilane-based crosslinking agent containing a plurality of chlorosilyl groups, and a nonaqueous organic solvent, thereby reacting the substrate surface with the molecules; and evaporating the solvent and then reacting the unreacted materials left on the substrate with water.

For instance, a solution is coated on the surface of a glass substrate, which contains OH groups (active hydrogen), and the substrate is left for about thirty minutes. The solution contains a chlorosilane-based adsorbent containing chlorosilyl groups and straight-chain carbon chains (such as a hydrocarbon-based or fluorocarbon-based adsorbent), a chlorosilane-based crosslinking agent containing a plurality of chlorosilyl groups, and a nonaqueous organic solvent. Since the surface of the glass substrate has a plurality of hydrophilic OH groups, dehydrochlorination occurs at the substrate surface. Thus, the chlorosilane-based adsorbent and the chlorosilane-based crosslinking agent are adsorbed and fixed to the substrate surface at the same time. Then, the nonaqueous organic solvent is evaporated, and the substrate is reacted with water (such as water in the atmosphere). (The reaction with water is also promoted by dehydrochlorination.) As a result, an about 5–10 nm thick polymeric chemically adsorbed film is formed which is chemically adsorbed to the substrate surface.

In this case, if the boiling point of the organic solvent of the solution containing a material containing chlorosilyl groups is low, the organic solvent is evaporated faster. However, the boiling point is preferably around 50–100° C. in consideration of handling.

(Characteristics of the Second Example)

A method of manufacturing a monomolecular chemically adsorbed film which is crosslinked by siloxane bonds includes the steps of:

contacting a substrate, containing active hydrogen groups on its surface, with a chlorosilane-based chemical adsorption solution prepared by mixing a chlorosilane-based adsorbent containing chlorosilyl groups and straight-chain carbon chains, a chlorosilane-based crosslinking agent containing a plurality of chlorosilyl groups, and a nonaqueous organic solvent, thereby reacting the substrate surface with the molecules;

rinsing and removing the unreacted materials left on the substrate with a nonaqueous organic solvent; and evaporating the solvent and then reacting the unreacted materials on the substrate with water.

As in the first Example, the solution containing the chlorosilane-based adsorbent, the chlorosilane-based crosslinking agent and the nonaqueous organic solvent, is coated or contacted with the surface of a glass substrate, and the substrate is then left for around thirty minutes. Since there are a plurality of hydrophilic OH groups on the surface of the glass substrate, dehydrochlorination is carried out on the surface, thus adsorbing and fixing the chlorosilane-based adsorbent and the chlorosilane-based crosslinking agent to the substrate surface at the same time. Then, the nonaqueous solvent is rinsed well with e.g., chloroform, and the substrate is then reacted with water, thus removing the excess adsorbent or crosslinking agent and then forming a 1–3 nm thick monomolecular film.

As the boiling point of the nonaqueous organic solvent containing a material which contains chlorosilyl groups is high, the solvent evaporates more slowly. Thus, an adsorption period is preferably prolonged. The boiling point is preferably about 100–250° C. in consideration of handling.

As a chlorosilane-based chemical adsorption agent of the First and Second Example, the materials shown in the following Chemical Formulas 1 and 2, for example, can be used as contains a material, containing fluorocarbon (—$CF_2$—) groups and chlorosilyl (—SiCl) groups, or hydrocarbon groups and chlorosilyl groups:

[Chemical Formula 1]

$$CF_3—(CF_2)_n—(R)_m—SiX_pCl_{3-p}$$

wherein n is 0 or an integer, or more preferably an integer between 1 and 22; R is an alkyl group, a phenyl group, a vinyl group, an ethynyl group, or substituent containing silicon or oxygen atoms; m is 0 or 1; X is H, an alkyl group, an alkoxysil group, a fluoroalkyl group, or a fluoroalkoxy group; and p is 0, 1 or 2.

[Chemical Formula 2]

$$CH_3—(CH_2)_n—(R)_m—SiX_pCl_{3-p}$$

wherein n is 0 or an integer, or more preferably an integer between 1 and 22; R is an alkyl group, a phenyl group, a vinyl group, an ethynyl group, or substituent containing silicon or oxygen atoms; m is 0 or 1; X is H, an alkyl group, an alkoxysil group, a fluoroalkyl group, or a fluoroalkoxy group; and p is 0, 1 or 2.

Furthermore, (1)–(5) shown in the following Chemical Formula 3 can also be used as the chemical adsorbent.

[Chemical Formula 3]

(1) $CH_3—(CH_2)_rSiX_pCl_{3-p}$
(2) $CH_3—(CH_2)_rSiX_pCl_{3-p}$
(3) $CH_3(CH_2)_sO(CH_2)_tSiX_pCl_{3-p}$
(4) $CH_3(CH_2)_u—Si(CH_3)_2(CH_2)_v—SiX_pCl_{3-p}$
(5) $CF_3COO(CH_2)_wSiX_pCl_{3-p}$ where r is 1–25; s is 0–12; t is 1–20; u is 0–12; v is 1–20; and w is 1–25.

If a compound containing a fluorocarbon group and a chlorosilyl group is used, water- and oil-repellent properties, anti-contamination, and lubricating properties are preferably added.

The specific examples of the adsorption compounds are as follows:

[Chemical Formula 4]

(1) $CH_3CH_2O(CH_2)_{15}SiCl_3$
(2) $CH_3(CH_2)_2Si(CH_3)_2(CH_2)_{15}SiCl_3$
(3) $CH_3(CH_2)_6Si(CH_3)_2(CH_2)_9SiCl_3$
(4) $CH_3COO(CH_2)_{15}SiCl_3$
(5) $CF_3(CF_2)_7—(CH_2)_2—SiCl_3$
(6) $CF_3(CF_2)_5—(CH_2)_2—SiCl_3$
(7) $CF_3(CF_2)_7—C_6H_4—SiCl_3$

As the chlorosilane-based crosslinking agent, $SiCl_4$, $SiHCl_3$, $SiH_2Cl_2$ or Cl—$(SiCl_2O)_n$—$SiCl_3$ (where n is an integer) can be used.

Instead of the chlorosilane-based adsorbents mentioned above, isocyanate-based chemical adsorbents (1)–(5) shown in the following Chemical Formula 5 can be used in which every chlorosilyl group is replaced by an isocyanate group.

[Chemical Formula 5]

(1) $CH_3—(CH_2)_rSiX_p(NCO)_{3-p}$
(2) $CH_3—(CH_2)_rSiX_p(NCO)_{3-p}$
(3) $CH_3(CH_2)_sO(CH_2)_tSiX_p(NCO)_{3-p}$
(4) $CH_3(CH_2)_u—Si(CH_3)_2(CH_2)_v—SiX_p(NCO)_{3-p}$
(5) $CF_3COO(CH_2)_wSiX_p(NCO)_{3-p}$ where r is 1–25; s is 0–12; t is 1–20; u is 0–12; v is 1–20; and w is 1–25.

In addition to the adsorbents mentioned above, the following (1)–(7) adsorption compounds in Chemical Formula 6 can also be used as in the First and Second Examples.

[Chemical Formula 6]

(1) $CH_3CH_2O(CH_2)_{15}Si(NCO)_3$
(2) $CH_3(CH_2)_2Si(CH_3)_2(CH_2)_{15}Si(NCO)_3$
(3) $CH_3(CH_2)_6Si(CH_3)_2(CH_2)_9Si(NCO)_3$
(4) $CH_3COO(CH_2)_{15}Si(NCO)_3$
(5) $CF_3(CF_2)_7—(CH_2)_2—Si(NCO)_3$
(6) $CF_3(CF_2)_5—(CH_2)_2—Si(NCO)_3$
(7) $CF_3(CF_2)_7—C_6H_4—Si(NCO)_3$

In using one of these adsorption compounds, there is merit in that no hydrochloric acid is generated.

The concentration of a material containing chlorosilyl groups or isocyanate groups depends on the types of an adsorbent containing chlorosilyl groups, a crosslinking agent, and a solvent. However, the concentration is preferably 0.01–100 wt. %, or more preferably 0.1–30 wt. %. In addition, by adding or incorporating a vinyl group or an ethynyl group into the alkyl chain section of the adsorbent, a coating film can be crosslinked by irradiating with around 5 megarad electron beams after the film is formed, so that the strength of the coating film can be further enhanced.

Substrates used in this invention include substrates having functional groups (e.g., hydroxyl groups (—OH)) containing active hydrogen at the surface, such as metals (Al, Cu, stainless, etc.), glass, ceramics, papers, fibers, leathers, and other hydrophilic substrates. A hydrocarbon adsorbent, having chlorosilyl groups or isocyanate groups, and a fluorocarbon-based adsorbent can react with the hydroxyl groups. If a substrate like plastics has no hydroxyl groups, the surface could be treated in advance in a plasma (for instance, at 100 W for 20 minutes) or corona atmosphere containing oxygen, thus making the substrate surface hydrophilic or—in other words, introducing hydroxyl groups to the substrate surface. However, a polyamide resin or a polyurethane resin has imino groups (>NH) on its surface, and dehydrochlorination is carried out between the hydrogen of the imino groups (>NH) and the chlorosilyl groups

of the chemical adsorbent, thus forming siloxane bonds

Thus, in this case, the surface treatment is not required for these materials.

When the solution that included the materials having chlorosilyl groups is coated, dry atmosphre or the gas that has little or no humidity (for instance, nitrogen gas and the like) is shown as the dry emvironments.

Hydrocarbon-based solvents containing no water, fluorocarbon-based solvents, or silicone-based solvents can be used as a nonaqueous solvent containing no active hydrogens. However, it is particularly preferable to use a solvent having a 50–300° C. boiling point. Besides petroleum-based solvents, the nonaqueous solvents include petroleum naphtha, solvent naphtha, petroleum ether, petroleum benzene, isoparaffin, normal paraffin, decalin, industrial gasoline, kerosene, ligroin, dimethyl silicone, phenyl silicone, alkyl modified silicone, polyether silicone, etc. Fluorocarbon-based solvents include freon-based solvents, Fluorinert (manufactured by 3M), Afulude (manufactured by Asahi Glass Co.,Ltd.), etc. The solvent may be used by itself, or may be mixed with other solvents as long as it can be mixed well with other solvents.

(Characteristics of the Third Example)

A polymer chemically adsorbed film, crosslinked by siloxane bonds, can be manufactured by a method including the steps of:

contacting a substrate surface containing active hydrogen groups, with an alkoxysilane-based chemical adsorption solution prepared by adding and mixing a silanol condensing catalyst in an alkoxysilane-based adsorbent (surface active agent), an alkoxysilane-based crosslinking agent and a nonaqueous organic solvent, thereby reacting the substrate surface with the molecules; and evaporating the solvent and then reacting the unreacted materials left on the substrate with water.

For example, a stainless steel substrate (or any substrate having active hydrogen on its surface) is cleaned well with an alkali detergent, and is then washed with water, thus removing grease from the substrate surface. As the alkoxysilane-based adsorbent, an alkoxysilane-based crosslinking agent, a nonaqueous organic solvent and a silanol condensing catalyst, a chemical adsorption solution is prepared in which n-dibutyl tin bisacetylacetate is mixed as a carboxylic metallic salt chelate. In a nitrogen gas atmosphere (or atmosphere with humidity of 35% or below), the stainless steel substrate is dipped in the chemical adsorption solution for about 10 minutes while it is heated to 70° C. Then, the substrate is taken out from the solution, and the organic solvent in the solution remaining on the substrate surface is evaporated, thereby forming a coating film which is made of the alkoxysilane-based adsorbent and the alkoxysilane-based crosslinking agent, and which contains the silanol condensing catalyst. By heating the adsorption solution in the film-forming process as mentioned above, the evaporation period of the solvent can be shortened. Furthermore, the substrate is taken out into the atmosphere, and is reacted with water in the atmosphere at room temperature. As a result, an about 5–10 nm thick polymer coating film is formed which is covalently bonded to the surface of the stainless substrate through Si.

(Characteristics of the Fourth Example)

A monomolecular chemically adsorbed film, crosslinked by siloxane bonds, can be manufactured by a method including the steps of:

contacting a substrate containing active hydrogen groups on its surface, to an alkoxysilane-based chemical adsorption solution prepared by adding and mixing a silanol condensing catalyst in an alkoxy-based adsorbent, an alkoxy-based crosslinking agent and a nonaqueous organic solvent, thereby reacting the substrate surface with the molecules;

rinsing and removing the unreacted materials left on the substrate with a nonaqueous organic solvent; and evaporating the solvent and then reacting the unreacted materials left on the substrate with water.

For example, a substrate having active hydrogen on its surface (such as a blue glass plate) is cleaned well with an alkali detergent, and is then washed with water, thus removing grease from the substrate surface. As the alkoxysilane-based adsorbent, an alkoxysilane-based crosslinking agent, a nonaqueous organic solvent and a silanol condensing catalyst, a chemical adsorption solution is prepared in which n-dibutyl tin bisacetylacetate is mixed as a carboxylic metallic salt chelate. In a nitrogen gas atmosphere (or atmosphere with relative humidity of 35% or below), the substrate is dipped in the chemical adsorption solution for about one hour. Then, the substrate is taken out from the solution, and is rinsed well with a non-aqueous organic solvent, thus reacting the substrate surface with water in atmosphere. As a result, a 1–3 nm thick monomolecular coating film, in which the alkoxysilane-based adsorbent and the alkoxysilane-based crosslinking agent are mixed, is formed on the substrate surface through Si.

In the above-described Third and Fourth Examples, a reaction shown in the following Formula 7 would occur between the alkoxysilane groups

where A represents an alkyl group) of the alkoxysilane adsorbent and the alkoxysilane crosslinking agent,and the hydroxyl groups of water cotent that adosorved on the substrate surface and the surface, at the interface between the adsorbent and the substrate if a catalyst is added to the alkoxysilane-containing chemical adsorption solution.

[Chemical Formula 7]

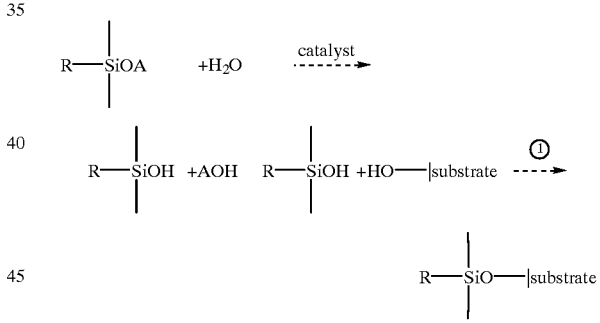

where ① indicates dehydration; R is a functional group containing a hydrocarbon chain or a fluorocarbon chain, or an alkoxy group; and A is a lower alkyl group containing 1–6 carbons.

Due to this treatment, an extremely thin monomolecular coating film with excellent anti-abrasion properties is formed by covalently bonding at least alkoxysilane adsorbent and crosslinking agent to the substrate surface through Si atoms at the interface between the substrate and the absorption solution.

In the Characteristics the Third and Fourth Example, as clearly seen from Formula 7 shown above, water plays an important role for the reaction. In other words, if the chemical adsorption solution contains water, alkoxy groups would be crosslinked to each other before they react to the substrate surface, thus preventing the reaction at the interface and the formation of a chemically adsorbed film. Thus, water in the adsorption solution should be minimized as much as possible, preferably to 10 ppm or less.

As the alkoxysilane adsorbent which can be used in these examples, $SiX_p(OA)_{4-p}$ (where X is H, an alkyl group, an alkoxyl group, a fluoroalkyl group, or a fluoroalkoxy group; A is an alkyl group; and p is 0, 1, 2 or 3) may be used. Especially when a material is used which is expressed as $CF_3—(CF_2)_n—(R)_m—SiX_p(OA)_{3-p}$ (wherein n is 0 or an integer; R is an alkyl group, a vinyl group, an ethynyl group, an aryl group, or substituent containing silicon or oxygen atoms; m is 0 or 1; X is H, an alkyl group, an alkoxysil group, a fluoroalkyl group, or a fluoroalkoxy group; A is an alkyl group, and p is 0, 1 or 2), a coating film with superior water- and oil-repelling properties can be formed. But the alkoxysilane adsorbent is not limited to this. Other useful adsorbents include:

$CH_3—(CH_2)_r SiX_p(OA)_{3-p}$;

$CH_3—(CH_2)_s—O—(CH_2)_t—SiX_p(OA)_{3-p}$;

$CH_3—(CH_2)_u—Si(CH_3)_2(CH_2)_v—SiX_p(OA)_{3-p}$; and $CF_3COO—(CH_2)_w—SiX_p(OA)_{3-p}$ where r is 1–25; s is 0–12; t is 1–20; u is 0–12; v is 1–20; w is 1–25; X is H, an alkyl group, an alkoxyl group, a fluoroalkyl group or a fluoroalkoxy group; A is an alkyl group; and p is 0, 1 or 2.

If a vinyl group or an ethynyl group is added or incorporated into the alkyl chain of the adsorbent, a coating film would be crosslinked by irradiating an electron beam at around 5 megarad after the formation of the film. Thus, the strength of the coating film can be further enhanced.

More specific examples of the molecules are shown in the following Chemical Formula 8.

[Chemical Formula 8]

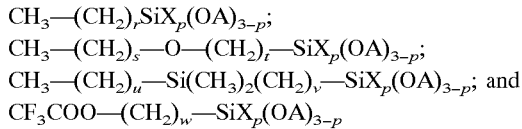

(1) $CH_3CH_2O(CH_2)_{15}Si(OCH_3)_3$ (2) $CF_3CH_2O(CH_2)_{15}Si(OCH_3)_3$ (3) $CH_3(CH_2)_2Si(CH_3)_2(CH_2)_{15}Si(OCH_3)_3$ (4) $CH_3(CH_2)_6Si(CH_3)_2(CH_2)_9Si(OCH_3)_3$ (5) $CH_3COO(CH_2)_{15}Si(OCH_3)_3$ (6) $CF_3(CF_2)_5—(CH_2)_2Si(OCH_3)_3$ (7) $CF_3(CF_2)_7—C_6H_4—Si(OCH_3)_3$ (8) $CH_3CH_2O(CH_2)_{15}Si(OC_2H_5)_3$ (9) $CH_3(CH_2)_2Si(CH_3)_2(CH_2)_{15}Si(OC_2H_5)_3$

(10) $CH_3(CH_2)_6Si(CH_3)_2(CH_2)_9Si(OC_2H_5)_3$

(11) $CF_3(CH_2)_6Si(CH_3)_2(CH_2)_9Si(OC_2H_5)_3$

(12) $CH_3COO(CH_2)_{15}Si(OC_2H_5)_3$

(13) $CF_3COO(CH_2)_{15}Si(OC_2H_5)_3$

(14) $CF_3COO(CH_2)_{15}Si(OCH_3)_3$

(15) $CF_3(CF_2)_9(CH_2)_2Si(OC_2H_5)_3$

(16) $CF_3(CF_2)_7(CH_2)_2Si(OC_2H_5)_3$

(17) $CF_3(CF_2)_5(CH_2)_2Si(OC_2H_5)_3$

(18) $CF_3(CF_2)_7C_6H_4Si(OC_2H_5)_3$

(19) $CF_3(CF_2)_9(CH_2)_2Si(OCH_3)_3$

(20) $CF_3(CF_2)_5(CH_2)_2Si(OCH_3)_3$

(21) $CF_3(CF_2)_7(CH_2)_2SiCH_3(OC_2H_5)_2$

(22) $CF_3(CF_2)_7(CH_2)_2SiCH_3(OCH_3)_2$

(23) $CF_3(CF_2)_7(CH_2)_2Si(CH_3)_2OC_2H_5$

(24) $CF_3(CF_2)_7(CH_2)_2Si(CH_3)_2OCH_3$

The concentration of the alkoxysilane adsorbent and the crosslinking agent used in the Third and Fourth Examples should be 0.1–100 wt. %, or more preferably 0.1–30 wt. %.

Tetraalkoxysilane, hexaalkoxydisiloxane, octaalkoxytrisiloxane, or the like can be used as the alkoxysilane-based crosslinking agent. The concentration of the agent is 0.01–50 wt. %, but is preferably 10–30 wt. % relative to the adsorbent.

The silanol condensing catalyst used in these examples includes carboxylic metallic salts, carboxylic ester metallic salts, carboxylic metallic salt polymers, carboxylic metallic salt chelates, ester titanates, or ester chelate titanates. It is particularly preferable to use carboxylic metallic salts such as tin (II) acetate, dibutyl tin dilaurate, dibutyl tin dioctate, dibutyl tin diacetate, dioctyl tin dilaurate, dioctyl tin dioctate, dioctyl tin diacetate, tin (II) dioctane acid, naphthenate lead, naphthenate cobalt and 2-ethyl hexene acid iron, carboxylic ester metallic salts such as dioctyl tin bisoctylthioglycol acid ester salt and dioctyl tin maleic ester salts, carboxylic metallic salt polymers such as dibutyl tin maleate polymer and dimethyl tin mercaptopropiolic acid salt polymer, carboxylic metallic salt chelates such as dibutyl tin bisacetyl acetate and dioctyl tin bisacetyllaurate, ester titanates such as tetrabutyltitanate and tetranonyltitanate, or ester chelate titanates such as bis(acetylacetonyl)dipropyltitanate.

Particularly, when the carboxylic metallic salt or the carboxylic metallic salt chelate is applied, a stable chemically adsorbed film can be formed. A preferable amount of the silanol condensing catalyst is 0.1–25 wt. % relative to the adsorbent and the cross-linking agent.

Especially when dealcohol reaction is carried out only at the alkoxy groups, an inorganic acid or organic acid may be ueed instead of the silanol condensing catalyst. However, in this case,it is not preferable that the chemical adsorption solution will have water for the above-described reasons. Thus, catalysts which can be applied in this invention preferably are limited to the silanol condensing catalysts mentioned above.

Hydrocarbon-based solvents containing no water, fluorocarbon-based solvents, or silicone-based solvents can be used as a nonaqueous solvent containing no active hydrogens. However, it is particularly preferable to use the solvent having a 50–300° C. boiling point. Besides petroleum-based solvents, the nonaqueous solvents include petroleum naphtha, solvent naphtha, petroleum ether, petroleum benzene, isoparaffin, normal paraffin, decalin, industrial gasoline, kerosene, ligroin, dimethyl silicone, phenyl silicone, alkyl modified silicone, polyether silicone, etc. Fluorocarbon-based solvents include freon-based solvents, Fluorinert (manufactured by 3M), Afulude (manufactured by Asahi Glass Co.,Ltd.), etc. The solvent may be used by itself, or may be mixed with other solvents as long as it mixes well with other solvents.

Substrates used in this invention include substrates having active hydrogen (e.g., hydroxyl groups (—OH)) at the surface, such as metals (Al, Cu, stainless, etc.), glass, ceramics, papers, fibers, leathers, and other hydrophilic substrates. If a substrate, like plastic or synthetic fiber, has no hydroxyl groups on its surface, the surface could be treated in advance in a plasma (for instance, at 100 W for 20 minutes) or corona atmosphere containing oxygen, thus making the substrate surface hydrophilic or, in other words, introducing hydroxyl groups to the substrate surface.

However, a polyamide resin or a polyurethane resin has imino groups (>NH) on its surface, and dealcohol reaction is carried out between the active hydrogen of the imino groups (>NH) and the alkoxysilyl groups

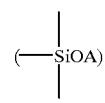

of the chemical adsorbent, thus forming siloxane bonds

Thus, in this case, the surface treatment is not required for these materials. When the substrate is nylon or polyurethane, imino groups (containing active hydrogen) are exposed to the surface, so that a chemically adsorbed monomolecular film can be manufactured in the same method as in the above-noted method of manufacturing a coating film on the glass substrate.

The chemically adsorbed films of the Second and the Third Examples of this invention can be applied to various materials listed below.

(a) Examples of substrates: metal, ceramic, plastic, wood, stone, and the like. The surface may be coated with a coating material.

(b) Examples of cutlery: kitchen knife, scissors, knife, cutter, engraver, razor, hair clippers, saw, plane, chisel, gimlet, badkin, bit (cutting tools), drill tip, edge of a mixer, juicer, blade of a mill, blade of a lawn mower, punch, straw cutter, staple of a stapler, can opener, surgical knife, and the like.

(c) Examples of needles: acupuncture needle, sewing needle, sewing-machine needle, tatami needle, needle of a syringe, surgical needle, safety pin, and the like.

(d) Examples of products in the pottery industry: products made of pottery, glass, ceramics or enameled products. For example, sanitary pottery (such as chamber pot, wash-bowl, bathtub, etc.), tableware (e.g., rice-bowl teacup, dish (plate), bowl, teacup, glass, bottle, coffee-pot (siphon), pan, earthenware mortar, cup, etc.), vases (flower bowl, flowerpot, bud vase, and the like), water tanks (breeding cistern, aquarium water tank, and the like), chemical labware (beaker, reactor vessel, test tube, flask, laboratory dish, condenser, mixing rod, stirrer, mortar, bat, syringe, etc.), bath tile, roof tile, enameled ware, enameled washbowl, enameled pan, and the like.

(e) Examples of mirrors: hand mirror, full-length mirror, bathroom mirror, washroom mirror, mirror for an automobile (e.g., back mirror, side mirror, etc.), half mirror, show window mirror, mirror at a department store, etc.

(f) Examples of molding parts: dies for press molding, dies for cast molding, dies for injection molding, dies for transfer molding, dies for inflation molding, dies for vacuum molding, dies for blow forming, dies for extrusion molding, dies for fiber spinning, calendar processing roll and the like.

(g) Examples of ornaments: watch, jewel, pearl, sapphire, ruby, emerald, garnet, cat's eye, diamond, topaz, blood stone, aquamarine, sadonikks, turquoise, agate, marble, amethyst, cameo, opal, crystal, glass, ring, bracelet, brooch, tiepin, earrings, necklace, jewelry, glasses frames made of platinum, gold, silver, bronze, aluminum, titanium, tin, the alloy of these metals or stainless, etc.

(h) Examples of molds for food: baking mold for a cake, baking mold for cookies, baking mold for bread, mold for chocolate, mold for jelly, mold for ice cream, oven ware, ice trays, and the like.

(i) Examples of cookware: pan, iron pot, kettle, pot, frying pan, hot plate, grill net, oil drainer, Takoyaki plate, and the like.

(j) Example of papers: photogravure paper, water- and oil-repellent paper, poster paper, high-grade pamphlet paper, etc.

(k) Examples of resins: polyolefin such as polypropylene and polyethylene, polyvinylchloride plastic, polyvinylidene, polyamide, polyimide, polyamideimide, polyester, aramide, polystyrene, polysulfone, polyethersulfone, polyphenylenesulfide, phenolic resin, furan resin, urea resin, epoxy resin, polyurethane, silicon resin, ABS resin, methacrylic resin, acrylate resin, polyacetal, polyphenylene oxide, and the like.

(l) Examples of household electric goods: television, radio, tape recorder, audio, CD, refrigerator, freezer, air conditioner, juicer, blender, blade of an electric fan, lighting equipment, dial, hair drier, etc.

(m) Examples of sporting goods: skies, fishing rod, pole for the pole vault, boat, sailboat, jet ski, surfboard, golf ball, bowling ball, fishing line, fishing net, fishing float, etc.

(n) Examples applied to vehicle parts:
(1) ABS resin: lamp cover, instrument panel, trimming parts, and protector for a motorcycle.
(2) Cellulose plastic: car mark and steering wheel.
(3) FRP (Fiber Reinforced Plastics): bumper and engine cover (jacket).
(4) Phenolic resin: brake.
(5) Polyacetal: wiper gear, gas valve and carburetor parts.
(6) Polyamide: radiator fan.
(7) Polyarylate: direction indicator lamp (or lens), cowl board lens and relay case.
(8) Polybutylene terephthalate: rear end and front fender.
(9) Poly amino-bismaleimide: engine parts, gear box, wheel and suspension drive system.
(10) Methacrylate resin: lamp cover lens, meter panel and its cover, and center mark.
(11) Polypropylene: bumper.
(12) Polyphenylene oxide: radiator grill and wheel cap.
(13) Polyurethane: bumper, fender, installment panel and fan housing.
(14) Unsaturated polyester resin: body, fuel tank, heater housing and meter panel.

(o) Examples of office supplies: fountain pen, pen, mechanical pencil, pencil case, binder, desk, chair, bookshelf, rack, telephone stand table, ruler, drawing instrument, etc.

(p) Examples of building materials: materials for a roof, outer wall and interiors. Roof materials such as brick, slate, tin (galvanized iron plate), and the like. Outer wall materials such as wood (including processed wood), mortar, concrete, ceramic sizing, metallic sizing, brick, stone, plastic, aluminum, etc. Interior materials such as wood (including processed wood), metals (such as aluminum), plastic, paper, fiber, and the like.

(q) Examples of building stones: granite, marble and others for building, building material, work of art, ornament, bath, grave stone, monument, gatepost, stone wall, paving stone, and the like.

(r) Examples of musical instruments and audio equipment: musical instruments such as percussion instruments, stringed instruments, keyboard instruments, wood wind instruments, brass instruments, etc., and audio equipment such as microphones and speakers. More specifically, drums, cymbals, violin, cello, guitar, koto, flute, clarinet, shakuhachi, horn, etc. for the musical instruments; and microphone, speaker, earphone, and the like for the audio equipment.

(s) Others: thermos bottles, vacuum equipment, highly water- and oil-repellent high capacity voltage insulators with excellent anti-contamination properties such as insulators for transmitting electricity, spark plugs, and the like.

EXAMPLES

The specific examples of this invention are explained hereinafter along with comparative examples.

(Example 1)

A substrate such as a glass substrate 1 (having a plurality of hydroxyl groups on its surface) was prepared which was cleaned beforehand to remove grease and which had a hyrophilic surface. As a silane-based surface active agent (mentioned as a chemical adsorption compound hereinafter) containing straight-chain hydrocarbon groups as carbon chains and Si, $CN(CH_2)_{14}SiCl_3$ and $CH_3SiCl_3$ at 1:5 mole ratio were used and dissolved in a nonaqueous solvent at 1 wt. %, thus preparing a chemical adsorption solution (adsorption solution 2). An n-hexadecane solution was used as the nonaqueous solvent. Glass substrate 1 was dipped and held in adsorption solution 2 in a dry atmosphere (at 30% or below relative humidity) for about fifty minutes (FIG. 1). Then, the substrate was taken out from the solution, and was rinsed with a fluorine-based nonaqueous solvent 3 (such as Freon 113). Then, the substrate was taken out in a predetermined direction, and was let stand in the direction so as to remove the rinsing solution and be exposed to water in the air (FIG. 2). An arrow 5 indicates the direction of lifting (removing) the glass substrate. In the above-described processes, dehydrochlorination occured between the

groups of the chlorosilane-based surface active agent and the hydroxyl groups of the substrate surface, thus forming bonds shown in the following Chemical Formulae 9 and 10. Furthermore, the substrate reacted with water in the atmosphere, thus forming bonds shown in the following Chemical Formulas 11 and 12.

[Chemical Formula 9]

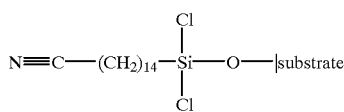

[Chemical Formula 10]

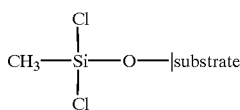

[Chemical Formula 11]

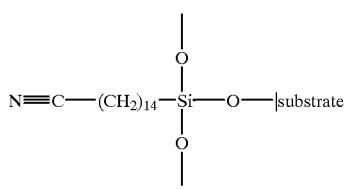

[Chemical Formula 12]

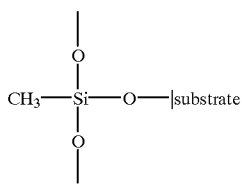

Due to the above-noted treatments, an about 1.5 nm thick chemically adsorbed monomolecular film 4 (primarily oriented chemically adsorbed monomolecular film) was chemically bonded by the reaction of the chlorosilane-based surface active agent at the substrate surface, having the hydroxyl groups, through siloxane covalent bonds. The straight-chain carbon chain of

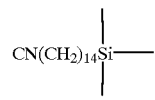

in the chemically adsorbed film had an about 60° tilted angle. The film was oriented almost in the opposite direction (solution drain-off direction) to the direction (arrow 5) of taking out the substrate from the rinsing solution (FIG. 3). In other words, adsorbed and fixed molecules were primarily oriented. The tilted angle can be controlled in a range between 0° and 90° by changing the composition of $CN(CH_2)_{14}SiCl_3$ and $CH_3SiCl_3$ to 1:0–0:1 (or more preferably, 10:1–1:50) mole ratio. In case of forming a film selectively, a substrate surface should be selectively covered with a resist, and then the resist can be removed after chemical adsorption processes. Since a chemically adsorbed film cannot be peeled off by an organic solvent, a resist that can be removed by an organic solvent should be used.

Figure 4:
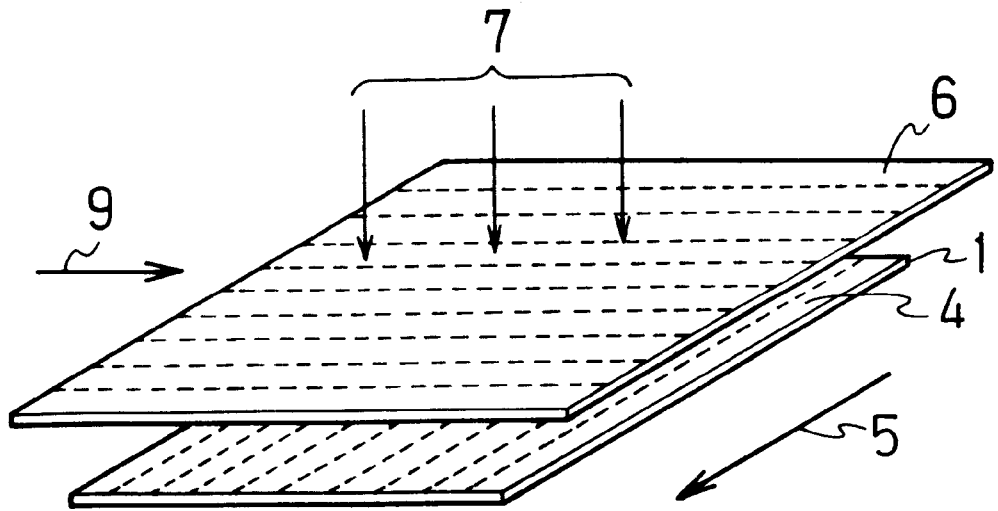
FIG. 4 is a perspective view, explaining a light exposure process to orient the molecules of the chemically adsorbed film of Example 1, which are adsorbed by light exposure in advance.

As a next step, a polarization plate 6 was laminated over the substrate so as to set a polarization direction almost at a right angle to the removal direction, and light 7 of 365 nm was then irradiated to the substrate at 100 mJ/cm² (FIG. 4). In reality, if the polarization direction intersected the removal direction at an angle of 90°, adsorbed molecules would be oriented in two directions. Thus, the polarization direction should be deviated from the 90° direction relative to the removal direction by several degrees. The polarization direction may be set parallel to the solution drain-off direction at maximum. In FIG. 4, arrow 9 indicates the polarization direction.

Figure 5:
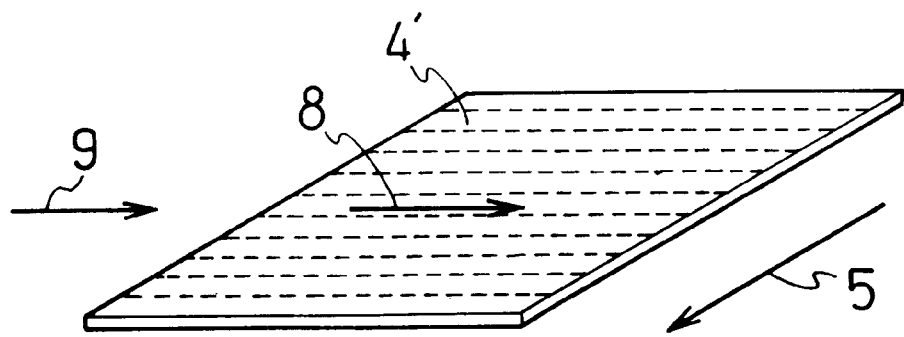
FIG. 5 is a perspective view, explaining the molecular orientation condition of the chemically adsorbed monomolecular film of Example 1 after the film is oriented by light.
Figure 6:
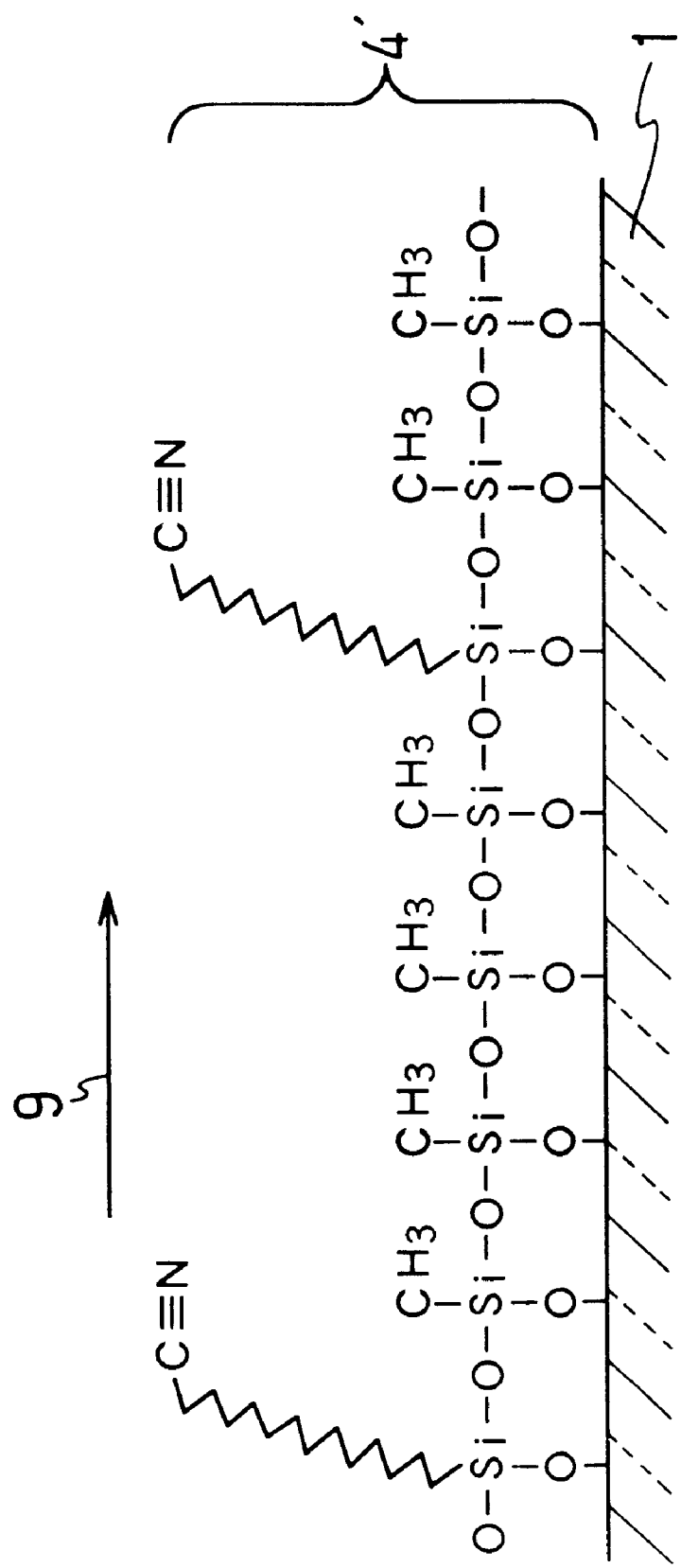
FIG. 6 is a cross sectional view enlarged to a molecular level, explaining the molecular orientation condition of the chemically adsorbed monomolecular film of Example 1 after the film is oriented by light.

The orientation direction of the straight-chain carbon chain in chemically adsorbed monomolecular film 4' was then examined. There was no change in the tilted angle, but the orientation direction 8 was changed to the direction almost at a right angle to the removal direction—in other words, the direction parallel to the polarization direction (arrow 9) of the irradiated light. Furthermore, the problems of uneven orientation were solved (FIG. 5 and FIG. 6)

When the orientation direction is to be changed selectively (arrow 9), an appropriate mask can be laminated over the polarization plate and exposure processes can be carried out in various times. As a result, chemically adsorbed monomolecular films having various different orientation directions were easily manufactured.

In this example, Freon 113 was applied as the solvent containing no water and as the fluorine-based nonaqueous solvent containing fluorocarbon groups. However, a solvent containing alkyl groups, carbon chloride groups or siloxane groups, could be used in this example. The examples of such solvents include normal hexane, chloroform, hexamethyldisiloxane, etc.

(Example 2)

A hydrophilic substrate such as a silicone substrate (which is formed with an oxide film and has a plurality of hydroxyl groups on its surface) was prepared. The substrate was cleaned beforehand to remove grease. As a silane-based surface active agent (mentioned as a chemical adsorption compound hereinafter) containing straight-chain hydrocarbon groups as carbon chains and Si, $Br(CH_2)_{16}SiCl_3$ and $C_2H_5SiCl_3$ at 1:2 mole ratio were used and dissolved in a nonaqueous solvent at 1 wt. %, thus preparing a chemical adsorption solution. A KF96L solution (silicone-based solvent manufactured by Shin-Etsu Chemical Co., Ltd.) was used as the nonaqueous solvent. Substrate 1 was dipped and held in the adsorption solution in a dry atmosphere (at 30% or below relative humidity) for one hour. Then, the substrate was taken out from the solution, and was exposed to air containing water. As a result, dehydrochlorination was carried out between the

groups of the surface active agent and the hydroxy groups of the substrate surface, thus chemically bonding and forming an about 5 nm thick chemically adsorbed polymer film through siloxane covalent bonds at the hydroxyl groups of the substrate surface. In this case, a washing process was not carried out, so that the tilted angles or orientation directions of the straight-type carbon chains were uneven.

In order to orient to a preferable direction, a polarization plate was laminated over the substrate. Light of 248 nm was irradiated to the substrate from a KrF eximer laser at 150 mJ/cm$^2$. As a result, the straight-chain carbon chains had uneven tilted angles, but the orientation direction of the chains became parallel to the polarization direction. Moreover, the uneven orientation was improved. In this case, however, the orientation degree was not as good as in Example 1.

In the above-mentioned two examples, i rays from an extra-high pressure mercury lamp at 365 nm and 248 nm light from the KrF eximer laser were applied, but any light can be applied as long as it is adsorbed by coating film materials. It is, however, more practical to apply light at 436 nm, 405 nm and 254 nm. Particularly, light at 248 nm or 254 nm is preferable since a large portion of the light is likely to be absorbed by coating film materials.

As the silane-based surface active agent containing straight-chain hydrocarbon groups, or siloxane bonding chains and chlorosilyl groups, or alkoxysilyl groups, or isocyanatosilyl groups, a chlorosilane-based surface active agent, having a cyano group or bromine (as a halogen atom) at one end of a molecule and a chlorosilyl group at another end, and a chlorosilane-based surface active agent, containing methyl groups and chlorosilyl groups, were mixed. In other words, various types of chlorosilane-based surface active agents having different molecular lengths were mixed in this example. However, this invention is not limited to this surface active agent. As shown below, chlorosilane-based surface active agents, having a halogen atom, methyl group, phenyl group (—$C_6H_5$), cyano group (—CN) or trifluorocarbon group (—$CF_3$) at the end of a hydrocarbon group, and chlorosilane-based surface active agents, in which a carbon at one section of a hydrocarbon group inside a molecule has optical activity, could be used. Particularly, the latter chlorosilane-based surface active agents oriented a film efficiently.

Furthermore, chlorosilane-based surface active agents, expressed as $Ha(CH_2)_nSiCl_3$ (where Ha is a halogen atom of chlorine, bromine, iodine, fluorine, and the like; and n is an integer from 1–24) can also be used. In addition, the following compounds can be used.

(1) $CH_3(CH_2)_nSiCl_3$ (where n is an integer preferably from 0 to 24)

(2) $CH_3(CH_2)_pSi(CH_3)_2(CH_2)_qSiCl_3$ (where p and q are integers preferably from 0 to 10)

(3) $CH_3COO(CH_2)_mSiCl_3$ (where m is an integer from 7 to 24)

(4) $C_6H_5(CH_2)_nSiCl_3$ (where n is an integer preferably from 0 to 24)

(5) $CN(CH_2)_nSiCl_3$ (where n is an integer preferably from 0 to 24)

(6) $Cl_3Si(CH_2)_nSiCl_3$ (where n is an integer preferably from 3 to 24)

(7) $Cl_3Si(CH_2)_2(CF_2)_n(CH_2)_2SiCl_3$ (where n is an integer preferably from 1 to 10)

(8) $Br(CH_2)_8SiCl_3$ (9) $CH_3(CH_2)_{17}SiCl_3$

(10) $CH_3(CH_2)_5Si(CH_3)_2(CH_2)_8SiCl_3$

(11) $CH_3COO(CH_2)_{14}SiCl_3$

(12) $C_6H_5(CH_2)_8SiCl_3$

(13) $CN(CH_2)_{14}SiCl_3$

(14) $Cl_3Si(CH_2)_8SiCl_3$

(15) $Cl_3Si(CH_2)_2(CF_2)_4(CH_2)_2SiCl_3$

(16) $Cl_3Si(CH_2)_2(CF_2)_6(CH_2)_2SiCl_3$

(17) $CF_3CF_3(CF_2)_7(CH_2)_2SiCl_3$

(18) $CF_3CF_3CH_2O(CH_2)_5Si(CH_3)_2Cl$

(19) $CF_3CF_3(CH_2)_2Si(CH_3)_2(CH_2)_{15}SiCl_3$

(20) $F(CCF_3(CF_2)_4(CH_2)_2Si(CH_3)_2(CH_2)_9SiCl_3$

(21) $F(CF_2)_8(CH_2)_2Si(CH_3)_2(CH_2)_9 SiC_3$

(22) $CF_3COO(CH_2)_{15}SiCH_3Cl_2$

(23) $CF_3(CF_2)_5(CH_2)_2SiCl_3$

(24) $CH_3CH_2CHC^*H_3CH_2OCO(CH_2)_{10}SiCl_3$

(25) $CH_3CH_2CHC^*H_3CH_2OCOC_6H_4OCOC_6H_4O(CH_2)_5SiCl_3$

In the above-mentioned formulas, C* indicates a carbon having optical activity.

Furthermore, surface active agents containing siloxane bonding chains and chlorosilyl groups, or alkoxysilane groups, or isocyanatosilane groups, as mentioned below could also be used. In this case, coating films were also well oriented.

(26) $ClSi(CH_3)_2OSi(CH_3)_2OSi(CH_3)_2OSi(CH_3)_2Cl$

(27) $Cl_3SiOSi(CH_3)_2OSi(CH_3)_2OSi(CH_3)_2OSi(CH_3)_2OSiCl_3$

In addition to the chlorosilane-based surface active agents, silane-based surface active agents, containing alkoxysilyl groups or isocyanatosilyl groups, shown below could be used.

(28) $Ha(CH_2)_nSi(OCH_3)_3$ (where Ha is a halogen atom of chlorine, bromine, iodine, fluorine, etc.; and n is an integer preferably from 1 to 24)

(29) $CH_3(CH_2)_nSi(NCO)_3$ (where n is an integer preferably 0 to 24)

(30) $CH_3(CH_2)_pSi(CH_3)_2(CH_2)_qSi(OCH_3)_3$ (where p and q are integers preferably from 0 to 10)

(31) $HOOC(CH_2)_mSi(OCH_3)_3$ (where m is an integer preferably from 7 to 24)

(32) $H_2N(CH_2)_mSi(OCH_3)_3$ (where m is an integer preferably from 7 to 24)

(33) $C_6H_5(CH_2)_nSi(NCO)_3$ (where n is an integer preferably from 0 to 24)

(34) $CN(CH_2)_nSi(OC_2H_5)_3$ (where n is an integer preferably from 0 to 24)

(Example 3)

Figure 7A:
FIG. 7(a) is a cross sectional view of a substrate enlarged to a molecular level, explaining the method of manufacturing a polymeric chemically adsorbed film of Example 3 of this invention.
Figure 7B:
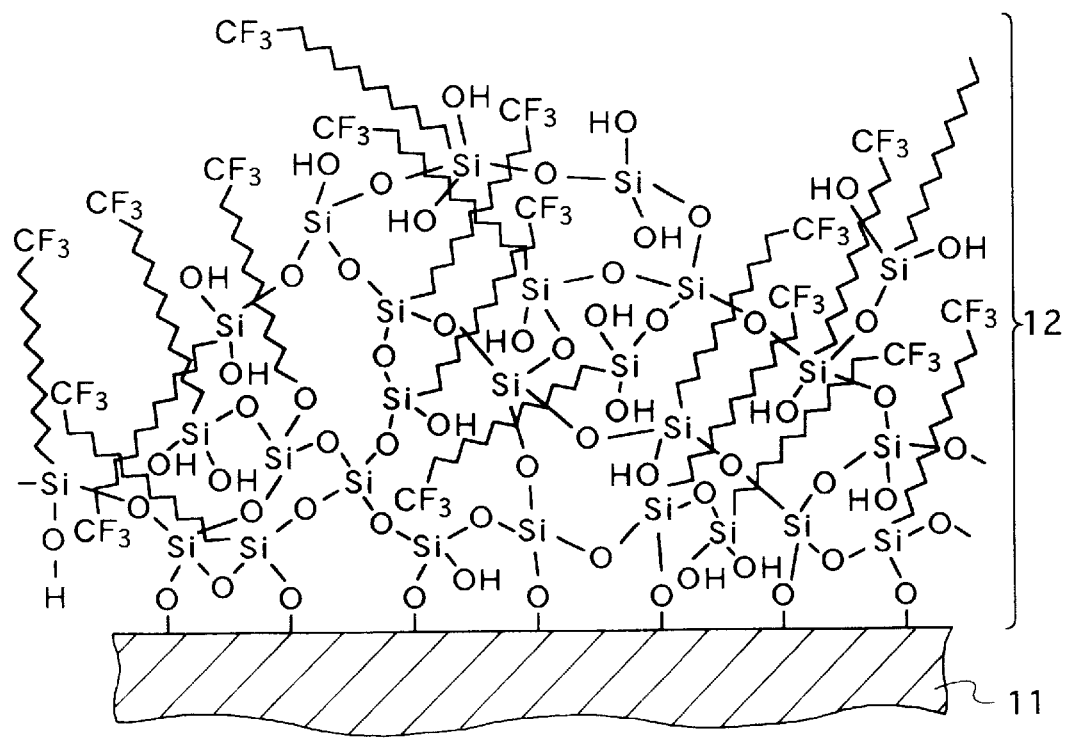
FIG. 7(b) is a cross sectional view of a substrate surface enlarged to a molecular level, explaining the method of manufacturing the polymeric chemically adsorbed film of Example 3.

As a substrate, an about 20 μm thick aluminum substrate 11 treated by alumite was prepared (FIG. 7(a)), and was cleaned with an alkali-based detergent in advance, so that grease on the substrate surface was washed away. In addition, a chemical adsorption solution was prepared by mixing 5% of $CF_3(CF_2)_7(CH_2)_2SiCl_3$, containing fluorocarbon groups and chlorosilane groups, as a chemical adsorbent, 3% of hexachlorodisiloxane as a crosslinking agent and 92% of cyclohexane (bp. 80° C.) as a nonaqueous solvent. Then, the substrate and the adsorption solution were moved to a dry atmosphere (at 5% relative humidity), and the adsorption solution was coated on the substrate surface. In this case, the relative humidity was 5%, but no practical problems were found as long as the relative humidity was 35% or below. The substrate and the solution were left in the atmosphere for about thirty minutes, and dichlohexane was evaporated and removed. The substrate was then taken out into a room atmosphere. It was found that the reactions shown in the following Chemical Formulas 13 and 14 were carried out between $CF_3(CF_2)_7(CH_2)_2 SiCl_3$ and hexachlorodisiloxane left on the substrate surface and water in the atmosphere. The products indicated in the following formulas were entangled and crosslinked, and a polymer coating film 12 as in FIG. 7(b) was formed on the substrate surface by covalent bonds.

[Chemical Formula 13]

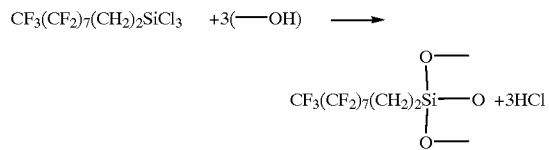

[Chemical Formula 14]

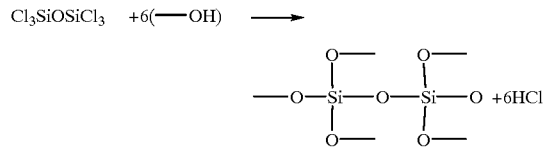

The thickness of the coating film was around 5 nm. Even if a cross-cut adhesion test was carried out on the coating film, the film did not peel off at all.

In order to examine the endurance of the coating film, a vehicle wiper blade was used so as to test abrasion properties under the same conditions as vehicles. More specifically, a wiper manufactured by Toyota Motor Co. was cut into 15 cm size, and was pressed by adding a load so as to provide 2 mm rubber deflection. The wiper was shifted back and forth twenty times per minute in tap water running at 2 ml/minute. The evaluation results are shown in Table 1. According to a 10,000 time rubbing test, the coating film showed excellent anti-abrasion properties.

In this example, cyclohexane was used as the solvent for the adsorption solution. However, any solvent having boiling point around 100° C. or below and able to dissolve an adsorbent and a crosslinking agent, such as normal hexane and Fluorinert (manufactured by 3M), can be easily used.

Even though $CF_3(CF_2)_7(CH_2)_2SiCl_3$ was used as the adsorbent in the example, the adsorbent is not limited to fluorine-based adsorbents. The adsorbent can be used ,for instance,to Ultra-thin hydrocarbon-based films with mechanical strength.

(Example 4)

Figure 8A:
FIG. 8(a) is a cross sectional view of a substrate enlarged to a molecular level, explaining the method of manufacturing a monomolecular chemically adsorbed film of Example 4 of this invention.
Figure 8B:
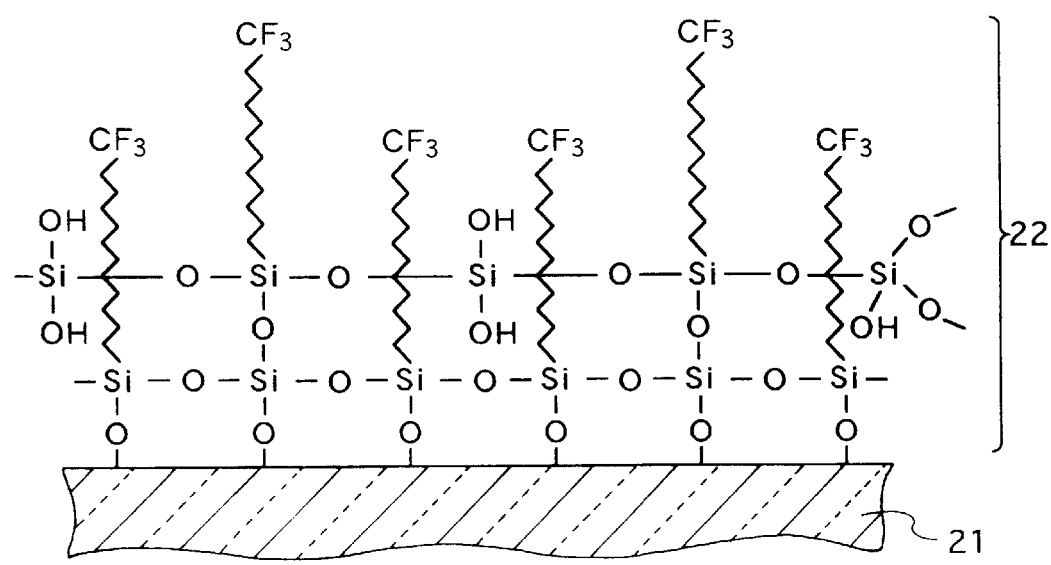
FIG. 8(b) is a cross sectional view of a substrate surface enlarged to a molecular level, explaining the method of manufacturing the monomolecular chemically adsorbed film of Example 4.

As a substrate, a glass substrate 21 was prepared (FIG. 8(a)), and was cleaned with an weak alkali-based detergent in advance, so that grease on the substrate surface was removed. On the other hand, a chemical adsorption solution was prepared by mixing 3% of $CF_3(CF_2)_5(CH_2)_2SiCl_3$, containing fluorocarbon groups and chlorosilane groups, as a chemical adsorbent, 1% of tetrachlorosilane as a crosslinking agent and 96% of hexadecane (bp. 287° C.) as a nonaqueous solvent. Then, the substrate and the adsorption solution were moved to a nitrogen atmosphere respectively, and the substrate was dipped and kept in the adsorption solution for one hour. The substrate was then taken out from the solution, and was rinsed well with chloroform (nonaqueous solvent) in the nitrogen atmosphere. After taking out the substrate into a room atmosphere, it was found that the reactions shown in the following Chemical Formulas 15 and 16 were carried out between $CF_3(CF_2)_5(CH_2)_2Si(Cl_2)O$— and $SiCl_3O$— left on the substrate surface and water in the atmosphere. The products indicated in the following formulas were entangled and crosslinked, and a monomolecular coating film 22 as in FIG. 8(b) was formed on the substrate surface by covalent bonds.

[Chemical Formula 15]

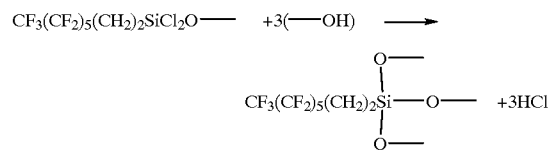

[Chemical Formula 16]

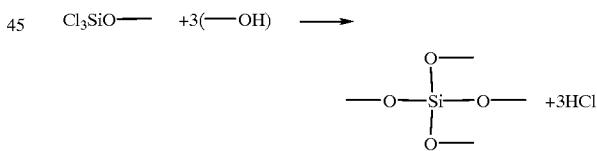

The thickness of the coating film was around 1 nm. Even if a cross-cut adhesion test was carried out on the coating film, the film did not peel off at all.

As in Example 3, the abrasion property test was carried out on the film. The results are shown in Table 1. According to a 10,000 time rubbing test, the coating film showed excellent anti-abrasion properties.

In this example, hexadecane was used as the solvent for the adsorption solution. However, nonaqueous solvents having a boiling point around 100° C. or above, such as xylene and toluene can be more useful since the composition of the adsorption solution cannot be changed easily when using such solvents.

(Comparative Example 1)

Tests were carried out under the same conditions as in Example 3, except that the hexachlorodisiloxane (crosslinking agent) was not used. As in Example 3 and 4, anti-abrasion properties tested by using the vehicle wiper blade are shown in Table 1.

(Comparative Example 2)

Tests were carried out under the same conditions as in Example 4, except that the tetrachlorosilane (crosslinking agent) was not used. As in Example 3 and 4, anti-abrasion properties examined by using the vehicle wiper blade are shown in Table 1.

TABLE 1

|  | Contact Angle 1 to Water (°) | | Contact Angle 2 to Water (°) |
| --- | --- | --- | --- |
|  | ① | ② | ③ |
| Example 3 | 111 | 110 | 106 |
| Example 4 | 113 | 111 | 108 |
| Com. Ex. 1 | 115 | 110 | 93 |
| Com. Ex. 2 | 120 | 111 | 96 |

Note:
① Initial Value
② Value After 5000 Abrasions
③ Value After 10,000 Abrasions As clearly seen from Table 1, the initial contact angles in Examples 3 and 4 are smaller than those in Comparative Examples 1 and 2. However, it is shown that chemically adsorbed films with excellent anti-abrasion properties can be provided by adding a crosslinking agent in the film-forming processes.

(Example 5)

Figure 9A:
FIG. 9(a) is a cross sectional view of a substrate enlarged to a molecular level, explaining the method of manufacturing a polymeric chemically adsorbed film of Example 5 of this invention.
Figure 9B:
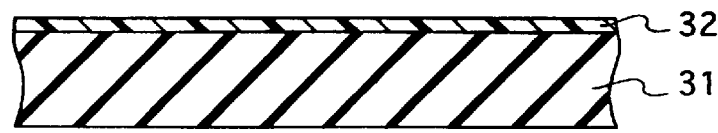
FIG. 9(b) is a cross sectional view of a coating film enlarged to a molecular level before it is reacted with water, explaining the method of manufacturing the polymeric chemically adsorbed film of Example 5.
Figure 9C:
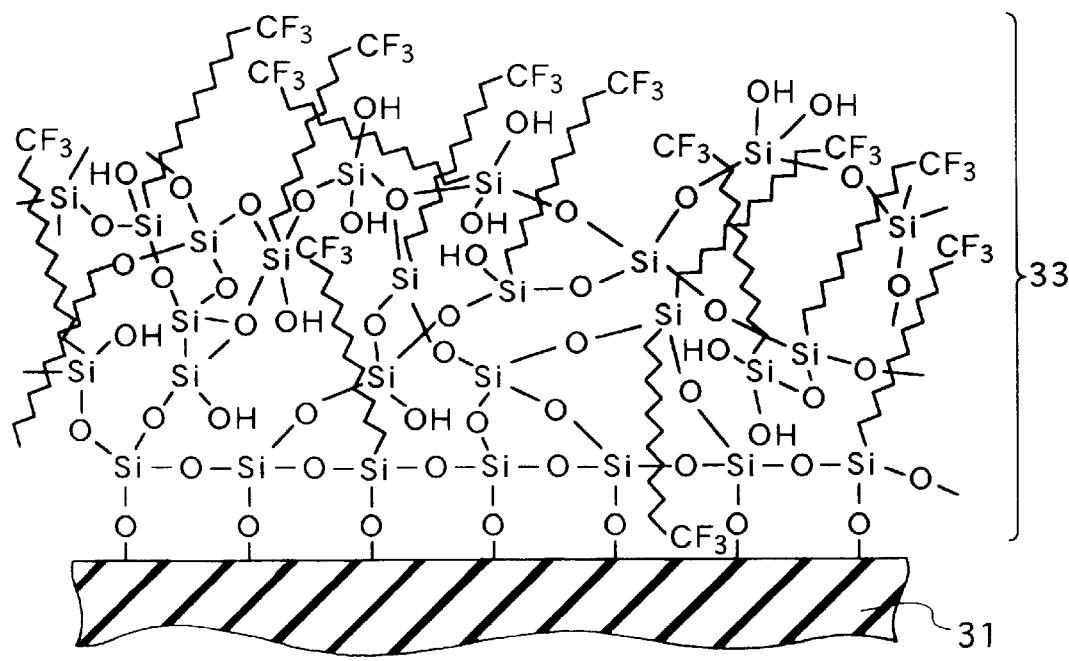
FIG. 9(c) is a cross sectional view of a substrate surface enlarged to a molecular level after it is formed with a coating film by reaction, explaining the method of manufacturing the polymeric chemically adsorbed film of Example 5.

As a substrate, a dressed tile 31 having active hydrogen at the surface like glass was prepared (FIG. 9(a)). The tile was washed with water and then dried after it was well cleaned with a weak alkali detergent. On the other hand, a chemical adsorption solution was prepared by mixing 5% of $CF_3(CF_2)_9(CH_2)_2Si(OCH_3)_3$ as a fluoroalkoxysilane-based adsorbent, 5% of hexamethoxydisiloxane as an alkoxysilane-based crosslinking agent, 0.5% of n-dibutyl tin bisacetylacetonate (carboxylic metallic salt chelate) as a silanol condensing catalyst, and 89.5% of Fluorinert FC-40 as a nonaqueous solvent containing no active hydrogen. Then, the tile and the adsorption solution were moved to an air atmosphere at 10% relative humidity. The solution was coated on the tile surface at about 1 micron thickness in the atmosphere, and the tile was left for one hour to evaporate Fluorinert. Then, a coating film 32 containing the silanol condensing catalyst, crosslinking agent and adsorbent was formed on the tile surface as shown in FIG. 9(b). Then, the tile was taken out in an atmosphere of 60% relative humidity, thus reacting the tile with water in the air at room temperature. As a result, the reactions shown in the following Chemical Formulas 17 and 18 were carried out, so that an about 8 nm thick polymeric chemically adsorbed film 33 with water- and oil-repellent properties as in FIG. 9(c) was formed on the tile surface by covalent bonds through Si.

[Chemical Formula 17]

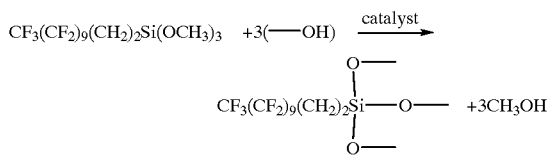

[Chemical Formula 18]

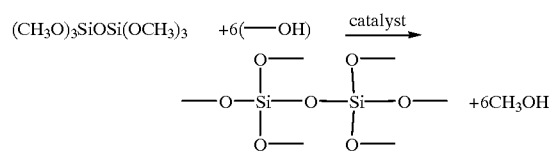

The cross-cut adhesion test was also carried out on the film, and the film did not peel off at all. The same method as in Example 3 was used to evaluate the water- and oil-repelling properties of the coating film. The results are shown in Table 2. It was found that the coating film had excellent anti-abrasion properties.

(Example 6)

Figure 10A:
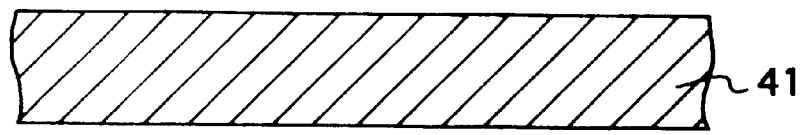
FIG. 10(a) is a cross sectional view of a substrate enlarged to a molecular level, explaining the method of manufacturing a monomolecular chemically adsorbed film of Example 6 of this invention.
Figure 10B:
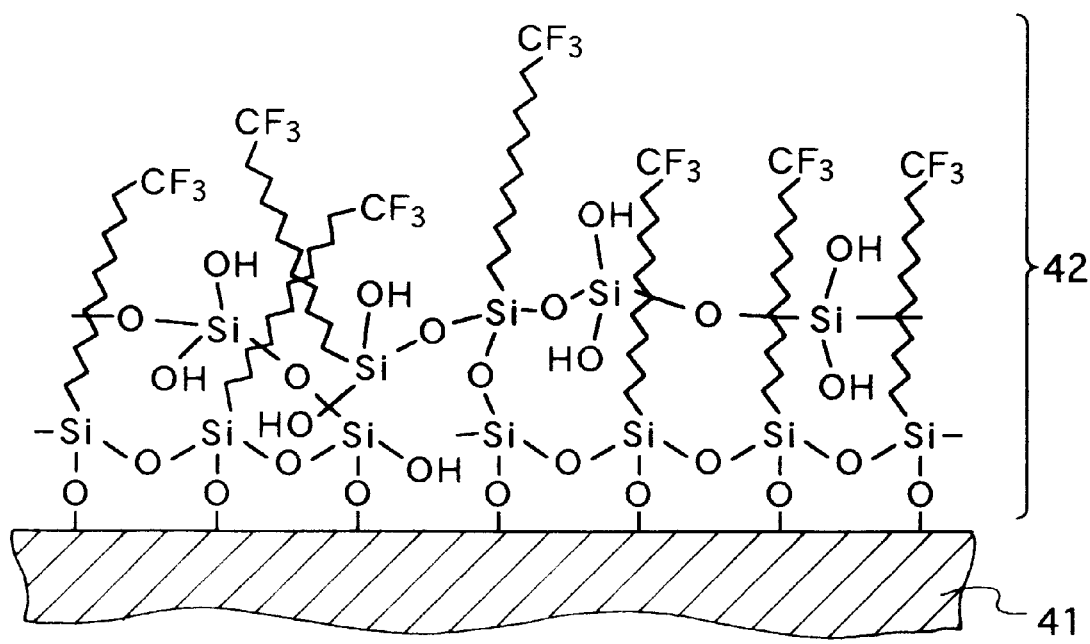
FIG. 10(b) is a cross sectional view of a substrate surface enlarged to a molecular level, explaining the method of manufacturing the monomolecular chemically adsorbed film of Example 6.

As a substrate, a stainless plate 41 was prepared (FIG. 10(a)), and was cleaned with an alkali detergent or the like and then with water, so that grease on the substrate surface was removed (FIG. 10(a)). On the other hand, a chemical adsorption solution was prepared by mixing 1% of $CF_3(CF_2)_7(CH_2)_2Si(OCH_3)_3$, containing fluorocarbon groups, as an alkoxysilane-based adsorbent, 0.5% of tetramethoxysilane as an alkoxysilane-based crosslinking agent, 0.05% of n-dibutyl tin diacetate (carboxylic metallic salt) as a silanol condensing catalyst, and 98.45% of n-decane as a nonaqueous solvent containing no active hydrogen. Then, the substrate and the adsorption solution were moved to a dry atmosphere at 5% or below relative humidity, and the substrate was dipped and kept in the adsorption solution at room temperature (if the temperature is below the boiling point of the nonaqueous solvent, the solution could be heated) for two hours. The substrate was then taken out from the solution, and was rinsed well with chloroform to remove the unreacted adsorbent and the unreacted crosslinking agent. By reacting the substrate with water by dipping the substrate in water, the reactions shown in the following Chemical Formulas 19 and 20 were carried out. Then, as shown in FIG. 10(b), an about 1.5 nm thick water- and oil-repellent chemically adsorbed monomolecular film 42, crosslinked by siloxane, directly covalently bonded through Si, on the stainless plate surface, was formed.

[Chemical Formula 19]

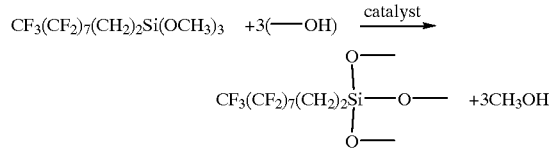

[Chemical Formula 20]

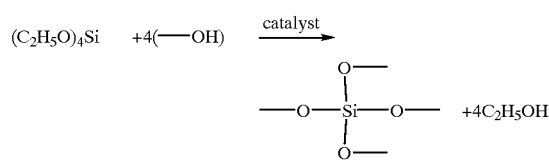

As in Example 5, the durability of the chemically adsorbed monomolecular film was evaluated by referring to contact angles. The results are shown in Table 2.

(Comparative Example 3)

Tests were carried out under the same conditions as in Example 5, except that the hexamethoxydisiloxane (crosslinking agent) was not used. Test results are shown in Table 2.

(Comparative Example 4)

Tests were carried out under the same conditions as in Example 6, except that the tetramethoxysilane (crosslinking agent) was not used. Test results are shown in Table 2.

TABLE 2

|  | Contact Angle 1 to Water (°) | | Contact Angle 2 to Water (°) |
| --- | --- | --- | --- |
|  | ① | ② | ③ |
| Example 5 | 110 | 108 | 105 |
| Example 6 | 113 | 110 | 107 |
| Com. Ex. 3 | 115 | 107 | 91 |
| Com. Ex. 4 | 117 | 110 | 94 |

Note:
① Initial Value
② Value After 5000 Abrasions
③ Value After 10,000 Abrasions As clearly seen from Table 2, the chemically adsorbed films of Examples 5 and 6 kept their water- and oil-repelling properties after being abraded the surface repeatedly by the rubber blade 10,000 times. On the other hand, the initial water- and oil-repelling properties of Comparative Examples 3 and 4 were slightly better than those of the films of Examples 5 and 6, but those properties declined to a large extent after the tests. This result indicates that the addition of crosslinking agents provides significant effects.

As described above, the method of manufacturing the first chemically adsorbed film of this invention includes the steps of forming a chemically adsorbed film on a substrate surface, and exposing light to the substrate surface through a polarization plate, thus efficiently forming a coating film with a superior adhering strength whose film-composing molecules are bonded and fixed to the substrate surface in a particular single orientation direction and at on e end.

Furthermore, in the method of man ufacturing the second and third chem ically adsorbed film, a coating film with excellent anti-abrasion properties can be provided by adding the same type of crosslinking agent as a chemical adsorbent to a chemical adsorption solution in the process of forming the film.

If a compound containing fluorocarbon groups is used as an adsorbent, an extremely thin and dense fluorocarbon-based chemically adsorbed film, having excellent water- and oil-repelling properties, anti-contamination properties and endurance and having no pinholes is chemically bonded to a substrate including metals such as a stainless steel, ceramics, and g lass. S ince this film is highly durable and has excellent properties, it can be applied to materials which require anti-heat, anti-weather, and anti-abrasion ultrathin coating, including electronics such as electrical goods (e.g., hot plates and rice cookers), automobiles, industrial equipment, mirrors, optical lenses, etc.

The invention may be embodied in other forms without departing from the spirit or essential characteristics thereof. The embodiments disclosed in this application are to be considered in all respects as illustrative and not r estrictive, the scope of the invention is indica ted by the appended claims rather than by the foregoing description, and all changes which come within the meaning and range of equivalency of the claims are intended to be embraced therein.

What is claimed is:

1. A method of manufacturing a monomolecular chemically adsorbed film, comprising the steps of:

contacting a substrate with a chemical adsorption solution, thus bonding and fixing molecules of a silane based surface active agent contained in said adsorption solution to a substrate surface at one end by chemical reaction between the molecules of said surface active agent and the substrate surface; and rinsing the substrate with an organic solvent and draining off the chemical adsorption solution from the substrate by tilting the substrate in a predetermined direction, thus orienting the molecules of said surface active agent in a predetermined single direction.

2. The method of claim 1, further comprising the step of exposing the substrate to light, which is polarized in a predetermined direction through a polarization plate, after the solution drain-off process.

3. The method of claim 1, wherein the silane-based surface active agent comprises straight-chain hydrocarbon groups or siloxane bond chains and at least one active group selected from the group consisting of chlorosilyl group, alkoxysilane group and isocyanatosilane group.

4. The method of claim 3, wherein the silane-based surface active agent, comprising straight-chain hydrocarbon groups or siloxane bond chains and at least one active group selected from the group consisting of chlorosilyl groups, alkoxysilyl groups and isocyanatosilyl groups, is a mixture of various silane-based surface active agents comprising different molecular lengths.

5. The method of claim 4, wherein a carbon at one section of the hydrocarbon group has optical activity.

6. The method of claim 4, wherein the hydrocarbon group comprises, at an end, a halogen atom or at least one group selected from the group consisting of a methyl group, a phenyl group ($-C_6H_5$), a cyano group ($-CN$), and a trifluoromethyl group ($-CF_3$).

7. The method of claim 2, wherein the light used for light exposure has at least one wavelength selected from the group consisting of 436 nm, 405 nm, 365 nm, 254 nm and 248 nm.

8. The method of claim 1, wherein the silane-based surface active agent comprises straight-chain hydrocarbon groups or siloxane bond chains and chlorosilyl groups or isocyanatosilane groups; and wherein a nonaqueous organic solvent comprising no water is used as the organic solvent applied for rinsing purposes.

9. The method of claim 8, wherein the nonaqueous organic solvent is at least one solvent selected from the group consisting of solvents comprising alkyl groups, fluorocarbon groups, chlorocarbon groups and siloxane groups.

* * * * *